United States Patent
Kile

(10) Patent No.: US 10,267,287 B2
(45) Date of Patent: Apr. 23, 2019

(54) OSCILLATING UNITES BUOYANCY HYDRO ELECTRIC LOOP PISTONS

(71) Applicant: Everett Ray Kile, Peoria, AZ (US)

(72) Inventor: Everett Ray Kile, Peoria, AZ (US)

( * ) Notice: Subject to any disclaimer, the term of this patent is extended or adjusted under 35 U.S.C. 154(b) by 156 days.

(21) Appl. No.: 15/383,337

(22) Filed: Dec. 19, 2016

(65) Prior Publication Data
US 2018/0171814 A1    Jun. 21, 2018

(51) Int. Cl.
F03B 17/00    (2006.01)

(52) U.S. Cl.
CPC ............. *F03B 17/005* (2013.01); *Y02E 10/20* (2013.01)

(58) Field of Classification Search
CPC ........ Y02E 10/20; F03B 17/025; F03B 17/02; F01D 13/02; F01D 15/10
See application file for complete search history.

(56) References Cited

U.S. PATENT DOCUMENTS

| | | | |
|---|---|---|---|
| 4,220,003 A * | 9/1980 | Doi | F03B 17/025 185/27 |
| 4,324,099 A | 4/1982 | Palomer | |
| 4,674,281 A | 6/1987 | Kim | |
| 4,718,232 A | 1/1988 | Willmouth | |
| 4,838,025 A * | 6/1989 | Nelis | F03B 17/025 60/398 |
| 6,769,253 B1 | 8/2004 | Scharfenberg | |
| 8,024,927 B1 | 9/2011 | Azizi | |
| 8,089,167 B2 | 1/2012 | Alvite | |
| 8,456,027 B1 | 6/2013 | Seehorn | |
| 8,796,870 B2 | 8/2014 | Cheung | |
| 8,887,497 B2 * | 11/2014 | Travis | F15B 3/00 60/398 |
| 8,910,475 B2 | 12/2014 | Chiu | |
| 9,234,494 B2 * | 1/2016 | Anteau | F03B 17/005 |
| 2006/0064975 A1 | 3/2006 | Takeuchi | |
| 2006/0267346 A1 | 11/2006 | Chen | |
| 2008/0289324 A1 | 11/2008 | Marion | |
| 2011/0126538 A1 * | 6/2011 | Kim | F03G 3/00 60/639 |
| 2013/0111887 A1 * | 5/2013 | Kwok | F03B 17/04 60/325 |
| 2015/0033717 A1 | 2/2015 | Hsu | |

FOREIGN PATENT DOCUMENTS

DE    102015009975 A1 *    2/2017    ........... F02G 1/0435

* cited by examiner

*Primary Examiner* — Michael C Zarroli

(57) ABSTRACT

This is a machine that contains a fluid loop that is utilized by using buoyancy and gravity to produce a fluid flow through a hydro turbine or other flow energy converter within the enclosed system. In one embodiment compressed gas is injected into a vessel at the underside of a piston to create a buoyant condition which forces the piston upward, thusly forcing the fluid above the piston through the hydro turbine. In another embodiment fluid or other matter fills a hollow piston at the top of the vessel and through the force of gravity descends, thusly forcing the fluid beneath the hollow piston downward and in turn upward through the adjoined vessel and then through the hydro turbine. In both referenced embodiments alternating ascent and descent cycles can be utilized within each adjoined vessel to cause fluid flow through the hydro turbine. Other embodiments are presented within as examples.

17 Claims, 20 Drawing Sheets

OSCILLATING UNITES BUOYANCY HYDRO ELECTRIC LOOP PISTONS

CROSS-REFERENCE TO RELATED APPLICATIONS

N/A

FEDERALLY SPONSORED RESEARCH

N/A

SEQUENCE LISTING OR PROGRAM

N/A

BACKGROUND—PRIOR ART

The following is a tabulation of some prior art that presently appears relevant:
U.S. Patents

| Pat. No. | Kind Code | Issue Date | Patentee |
| --- | --- | --- | --- |
| 8,024,927 | B1 | 2011 Sep. 27 | Azizi |
| 8,456,027 | B1 | 2013 Jun. 4 | Seehorn |
| 8,796,870 | B2 | 2014 Aug. 5 | Cheung |
| 8,910,475 | B2 | 2014 Dec. 16 | Chiu |
| 8,089,167 | B2 | 2012 Jan. 3 | Alvite |
| 4,324,099 | N/A | 1982 Apr. 13 | Palomer |
| 4,674,281 | N/A | 1987 Jun. 23 | Kim |
| 6,769,253 | B1 | 2004 Aug. 3 | Scharfenberg |
| 4,718,232 | N/A | 1998 Jan. 12 | Willmouth |

U.S. Patent Application Publications

| Publication No. | Kind Code | Publ. Date | Applicant |
| --- | --- | --- | --- |
| 20150033717 | A1 | 2015 Feb. 5 | Hsu |
| 20080289324 | A1 | 2008 Nov. 27 | Marion, Woloshyn |
| 20060064975 | A1 | 2006 Mar. 30 | Takeuchi |
| 20060267346 | A1 | 2006 Nov. 3 | Chen |

Energy is in high demand and the materials such as fossil fuels burnt in power plants and radioactive fuels used in nuclear power plants are in short supply. I believe most people are aware of the severe problems that accompany both of these methods of producing electricity and the facts of which could fill a thousand pages, so I will keep this brief. Pollutants in the air from fossil fuels end up in our lungs, our water, and our food. Radioactive fuels pose a radioactive waste disposal problem and extreme health risk. I believe the people of this planet deserve methods of producing clean and cheap electricity. It seems that small strides to achieve this goal occasionally are brought into the limelight. However small a step, a step forward is a step forward and is desperately needed right now to help alleviate the suffering caused by pollution generated by the production of electricity from dirty means.

I like the idea of solar energy capture for a clean energy source. Their major drawbacks are that they produce electricity while receiving sunlight from within limited degrees of angle, and their efficiency wanes quickly when outside of this angle of direct sunlight. Cloud cover doesn't help any either, not to mention what night time does to the poor solar panels electric output. I would have to say that solar energy capturing technology would be the tortoise in this race to produce clean energy. The solar cell was invented in the late 1800's, and achieved 14% efficiency in 1960. The solar cells being produced now are around 23% efficient. On the brighter side, a new means of capturing solar energy has just been discovered and is about 35% efficient. At this rate the solar cell may achieve 50% efficiency within the next fifty years, we can always hope, right?

Wind turbines are another clean energy source. Their major drawbacks are they don't generate electricity when the wind doesn't blow, very limited site locations that are appropriate due to factors such as wind consistency and proximity to a city or town that could utilize the electricity produced, and some people see them as being unsightly monsters dotting the landscape.

Oscillating water column devices are now producing small amounts of electricity and are in limited use around ocean and sea shores. Their major drawback is they are confined to use at the shore line and within a reasonable distance from the shore line.

The use of water to provide kinetic energy to produce motion to do work has been around for many years. Water wheels have been utilized to power stones to grind grains, and to pump water to higher elevations for irrigation and other purposes for over two thousand years. The world's first use of a hydroelectric power plant was almost one hundred and thirty nine years ago. Today, hydroelectric dams produce clean cheap electricity wherever they can be built. However, ecologically good locations to build dams are in short supply. They also have some drawbacks, such as hindrance to fish and other aquatic species, not only to better feeding grounds but to critical spawn sites. They do provide nice recreational areas for us humans though.

The above mentioned clean energy technologies all have one thing in common, they capture, harness, utilize, or otherwise use, a provided by nature, natural phenomenon. The wind, the sun, the water's waves created by the wind, and the gravitational force and buoyancy force provided through water.

New technologies that utilize gravity and buoyancy to produce kinetic energy are emerging and it is up to all of us to do our best to bring clean and inexpensive electrical power plants to the forefront of today's society. The following are examples of prior art that have tried to do just that. I applaud their efforts and their ingenuity.

I present this prior art example first because it is the only one on my list that I feel needs some clarification regarding certain features. I am only pointing out some of the features of U.S. Pat. No. 8,024,927 B1 (Azizi, issued 2011 Sep. 27) in the name of clarity. U.S. Pat. No. 8,024,927 B1 (Azizi, issued 2011 Sep. 27) teaches the use of a float adapted with valves at its top, side, and bottom for the purpose of accepting and discharging (pressurized or compressed) gas and fluid so as to alternate the floats buoyancy between negative and positive so as to make the float rise and fall within a tubular vessel filled with fluid. The float is disposed within the vessel so as to force the fluid above the float upward and through a turbine to produce electricity. The accepting and discharging of (pressurized or compressed) gas and fluid into and out of a chamber within the float is accomplished through the arrangement of a valve to valve coupling at the beginning and end of the float's rise and fall cycle. I pulled the following from the specifications verbatim, ("the float member begins to ascend inside the tube causing, in turn, the water inside the tubular member ahead of the rising float to become increasingly more pressurized due directly to the effect of the float's buoyancy.")("when gas is introduced into one float, that float begins to rise within its tube, steadily increasing the water pressure ahead of it in the tube as the float ascends with the water reaching near or at its maximum pressure as it is forced through the tapered portion or nozzle formed at the top end of the tube.")("water flowing in advance of ascending float member continues to flow with a steady build up of pressure.") I refer to the above quotes usage in particular of the phrases "increasingly more pressurized" "steadily increasing the water pressure" "steady build up of pressure" I feel these statements need to be clarified. The apparatus uses a float member which is of a fixed volume and therefore can only displace a fixed volume of fluid, the fixed volume of fluid being the driving gravity force which creates the buoyancy force which exerts the pressure on the fluid above it. Therefore the pressure exerted on the water above the float by the float rising will be the same during the beginning of the float's ascent as it will be at the end of its ascent. That was point one. The other point is within the claims. Nowhere within the claims do I read how or from where the buoyancy force derives its gravity force. It is clear from the specifications that the apparatus has to sit mostly submerged within a body of water such as a lake, ocean, or reservoir and that these bodies of water that the apparatus would be required to sit within would supply the gravitation force required to make the apparatus function. I call attention to this because I'm under the belief that the claims must state a functional system. Without the body of water that his apparatus needs to be mostly submerged in to supply the gravity force, his apparatus will not function. Again, I have only pointed out the above to help clear up some confusing statements about features of his apparatus.

U.S. Pat. No. 4,324,099 (Palomer, issued 1982 Apr. 13) teaches the use of water from a higher level being allowed to flow into chambers containing floats that are mechanically linked to a crankshaft and through the use of a valve system the water lifts and lowers the floats to create rotational motion upon the crankshaft.

U.S. Pat. No. 4,674,281 (Kim, issued 1987 Jun. 23) teaches an apparatus for generating power by using two cylinders and a float member within each cylinder and rotating lever arms attached to the float members at one end to a crank connected to a shaft at the other end whereby the introduction of fluid and air into the first cylinder and its float member, respectively, and simultaneously, the discharge of fluid and air from the second cylinder and its float member, respectively, cause the float members to rise and fall accordingly and, in turn, the lever arms to move up and down and the crank to rotate about the crankshaft.

U.S. Pat. No. 8,456,027 B1 (Seehorn, issued 2013 Jun. 4) and U.S. Pat. No. 8,796,870 B2 (Cheung, issued 2014 Aug. 5) both teach the use of float members which are adapted to accept and discharge air and water to change their perspective buoyancy between being negative and positive buoyant, thusly being disposed within a chamber or chambers filled with fluid two floats being linked together by cables or chains work in opposing up and down motion and through their linkage apply force and motion to gears and shafts to turn electrical generating means.

U.S. Pat. No. 6,769,253 B1 (Scharfenberg, issued 2004 Aug. 3) teaches a turbine power plant using buoyant force in the form of air propelled against a series of vanes coupled to a shaft connected to a turbine.

U.S. Pat. No. 4,718,232 (Willmouth, issued 1998 Jan. 12) teaches the use of buoyancy and gravity in combination within an apparatus comprising a long chain having a series of attached float members extending around a sprocket with the float members immersed in liquid as they rise driven by the force of buoyancy and passing through air space as they fall pulled down by the force of gravity.

U.S. Pat. No. 8,910,475 B2 (Chiu, issued 2014 Dec. 16) teaches the use of a float in the form of a bladder within a cage like structure which is mechanically linked by chain to an overhead gear and shaft, the float bladder being adapted to accept and discharge air and being disposed within a tubular member filled with water is alternately made to be positively and negatively buoyant to move upward and downward within the tubular member and thereby forcing the linked chain to drive the gear and shaft to produce rotary motion.

U.S. Pat. No. 8,089,167 B2 (Alvite, issued 2012 Jan. 3) teaches the use of a weighted air bag which is adapted to accept and discharge air and is mechanically linked to gears and shafts so as to rise within a fluid while inflated and to fall by the weight while deflated thereby creating motion through the mechanical linkage to the gears and shaft.

U.S. patent application number 2006/0064975 A1 (Takeuchi, published 2006 Mar. 30) teaches the introduction of continuous bubbled gas moving through a liquid to force a conveyor fitted with numerous bucket-like devices to rotate which in turn causes a power generating turbine to rotate.

U.S. patent application number 2006/0267346 A1 (Chen, published 2006 Nov. 3) teaches the use of a water tower that accumulates water at the top through the application of buoyancy and the use of transmission rods to force the water up, whereupon guided by the principles of gravity water cascades down a pipe to drive a turbine to produce electricity.

U.S. patent application number 2008/0289324 A1 (Marion, Woloshyn, published 2008 Nov. 27) teaches the use of a single buoy with an opening at the bottom to receive air and so as to displace the water within when so charged with air at its lower position within a water filled vessel, the buoy being equipped with a mechanical valve at its top which is depressed to release the air from within when it reaches its uppermost position, the buoy also being mechanically linked to chain and gears to create rotary motion to generate electricity as it rises and falls.

U.S. patent application number 2015/0033717 A1 (Hsu, published 2015 Feb. 5) teaches the use of water drawing partitions connected to a conveyer-like apparatus disposed within a water drawing pipe and through the injection of air at the bottom thereof the air collects under the water drawing partitions and forces the partition and the water above the partition upward and into a collecting apparatus for conversion to electricity.

Again, I can only admire the achievements of those who have come before and strived to better mankind's situation on this beautiful blue planet of which we all share.

SUMMARY

O.U.B.H.E.L.P. utilizes at least two separate fluid columns. Each fluid column is contained within its own vessel. The fluid columns are in fluid communication with each other at the top and at the bottom of each vessel allowing fluid to flow between each vessel at the top and at the bottom. This enclosed fluid loop allows for gravity and buoyancy to be utilized in a manner so as to force fluid through a hydro turbine which uses the kinetic energy of the fluid to produce electricity or to do other work.

O.U.B.H.E.L.P. in one embodiment creates a condition that allows for and utilizes an expanding compressed gas pocket which forces a piston above the expanding compressed gas pocket upward within a fluid filled vessel during an ascent cycle. The expanding compressed gas pocket constitutes a buoyancy force. As the piston ascends it forces the fluid above the piston to a hydroelectric turbine at an ever increasing pressure during the ascent cycle.

The closed fluid loop system of O.U.B.H.E.L.P. is very versatile and allows another of the embodiments to function without using pressurized or compressed gas. It's designed to accept fluid or other matter into the top of a hollow piston when it has reached the top of its ascent cycle and to empty the fluid or other matter from the bottom of the hollow piston when it has reached the bottom of its descent cycle, all at atmospheric pressures. The fixed size of the hollow piston allows for a consistent and steady pressure to be applied to the hydroelectric turbine during each descent and ascent cycle.

BRIEF DESCRIPTION OF THE DRAWINGS

For a fuller understanding of the nature and advantages of the present disclosure, reference should be had to the following detailed descriptions taken in conjunction with the accompanying drawings, in which.

DETAILED DESCRIPTION

Figure 1:
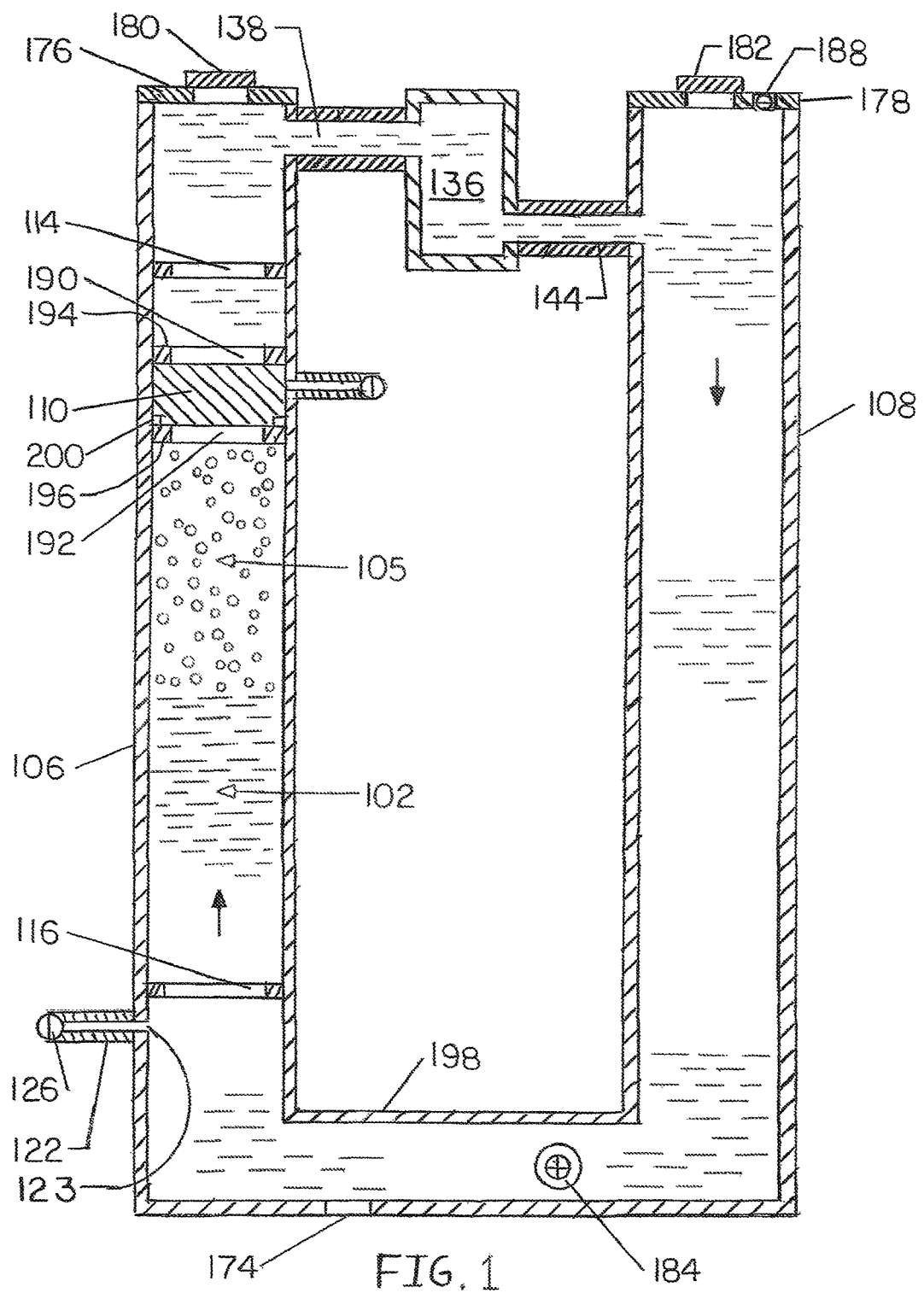
FIG. 1 is a front elevation cross-sectional view of embodiment "A" and is referenced by section lines 1-1 in FIG. 6. It is a depiction of a main piston ascending.

It is hereby noted in the description, if a numerical value or range is presented, each numerical value should be read once as modified by the term "about" (unless already expressed so modified), and then read again as not so modified unless otherwise indicated in context. Also, in the description, it should be understood that an amount range listed or described as being useful, suitable, or the like, is intended that any and every value within the range, including the end points, is to be considered as having being stated. For example, "a range of from 1 to 10" is to be read as indicating each and every possible number along the continuum between about 1 and about 10. Thus, even if specific points within the range, or even no point within the range, are explicitly identified or referred to, it is to be understood that the inventor appreciates and understands that any and all points within the range are to be considered to have been specified, and that the inventor possesses the entire range and all points within the range.

The specifications disclosed herein including, but not limited to sizes, shapes, weights, positioning of components, the elevation/depth of components and materials utilized will be chosen by those skilled in the art to meet particular application parameters, and should be tested for maximum efficiency. Inclusively, all components and component connections will be built to the best engineering practices at the time.

Additionally, any design specifications mentioned in this document are merely illustrative of the operation of the overall system. These calculations and tests are within the abilities of anyone skilled in the art of power generation and fluid dynamics, enabling them to practice the embodiments disclosed herein without undue experimentation or further inventing.

Additionally, the diagrams that are presented herein merely serve to facilitate the explanation of the principles of the operation of O.U.B.H.E.L.P and its various methods of operation and are not meant to imply exact scale of any particular design that has been engineered for a specific purpose. The relative volumes and configurations of various power plant components, which will vary according to individual needs and certain applications, will be of particular importance to efficiency results. Certain features depicted in the figures that follow have been exaggerated in order to more clearly explain the principles taught by this disclosure.

All components of O.U.B.H.E.L.P. can be made from various materials and materials chosen will be selected using the best engineering practices at the time. Any specialty materials will be specified within the descriptions.

The system for supplying the compressed gas to O.U.B.H.E.L.P. can be of varying nature, such as but not limited to an air compressor, industrial blow-off which is normally either vented directly to the atmosphere or put through a turbo expander, natural gas or other geological gas deposits that are contained underground under high pressure could also be used after being regulated. The supply system for providing the compressed gas has not been shown.

The supporting structure for O.U.B.H.E.L.P. has not been shown. Any and all supporting structure would be built to the best engineering practices at the time, and would be engineered per each O.U.B.H.E.L.P's. varying specifications. Furthermore, mechanical systems, electronic devices, and general control systems utilized in the operation of O.U.B.H.E.L.P. are not described or shown but are implied. Control systems will need to be employed in any given application of O.U.B.H.E.L.P. to operate valves and coordinate the timing of the various systems such as but not limited to compressed gas injection, compressed gas evacuation, etc. Control systems and electronic devices can include but are not limited to computers, smart boards, motors, sensors and solenoids required to operate valves, vents, electromagnetic securing devices and other operational systems. The implementation of these systems and devices is within the ability of anyone skilled in the relevant art without undue experimentation or further inventing, and may vary depending on the particular application in which O.U.B.H.E.L.P. is being implemented.

The fluid used within O.U.B.H.E.L.P. can be of most any nature such as but not limited to fresh water, salt water, bio oil, synthetic oil, or any combination thereof. Natural and synthetic lubricants which are not necessarily oil based could be used as additives to the fluid to help facilitate a lower friction environment. Rust inhibitors could be added to the fluid if desired or needed to help protect any ferrous materials that would be in contact with the fluid.

O.U.B.H.E.L.P. utilizes a main upper securing means, a main lower securing means, an other upper securing means, and an other lower securing means. These means can be of varying devices, such as but not limited to a mechanical lever latching mechanism, a suction device, a mechanical gear to gear mechanism, a frictional braking mechanism, or an electromagnetic device. For the purposes of simplicity these various securing means will be referred to as an electromagnet within the descriptions.

An undercarriage with wheels which is referred to within embodiment "G" can be replaced with other types of support and low friction devices, such as but not limited to a magnetic levitation system (not shown) such as but not limited to the ones used with maglev trains. These mentioned and implied devices can also be utilized in the other embodiments.

O.U.B.H.E.L.P. is a self-contained system and can be used to produce energy practically anywhere, such as but not limited to a harsh desert environment, a rainforest environment, even in extreme cold environments if antifreeze is added to the fluid, underground facilities which have a modicum of slope or high enough ceiling could even house a functioning O.U.B.H.E.L.P.

O.U.B.H.E.L.P. can be erected at a low degree of angle and therefore be constructed using the natural slope of a multitude of geological locations. The length of the vessels can be buried under the surface with just the bottom portion and the top portion of O.U.B.H.E.L.P. being above ground so as to allow for access to the lower maintenance hatch, and the hydro turbine and reservoir sections. Through this application of the embodiment, O.U.B.H.E.L.P. could be constructed to great lengths and still allow for the surface ground above the buried vessels to be utilized for other purposes such as but not limited to farming, grazing of livestock, and any other purpose that would not build heavy or permanent structures directly above the buried vessels. This would give O.U.B.H.E.L.P. a very small footprint for a large capacity power plant.

O.U.B.H.E.L.P. operates using buoyancy which Archimedes describes as; the upward buoyant force that is exerted on a body immersed in a fluid, whether fully or partially submerged, is equal to the weight of the fluid that the body displaces and acts in an upward direction.

The Oscillating Unites Buoyancy Hydro Electric Loop Pistons machine, or O.U.B.H.E.L.P. for short, is a self-contained system for producing electricity through the use of a hydro turbine coupled to an electric generator (not shown). O.U.B.H.E.L.P. is designed to create a buoyant condition within a fluid loop which allows for the fluid to seek equilibrium and in doing so forces the fluid above the buoyant condition through the hydroelectric turbine or turbines, and in doing so also resupplies its own source of gravity which allows the system to function. The "O" within the name is symbolic of the fluid loop contained within this system. The "U" within the name is symbolic of fluid's affinity to seek equilibrium.

All mentioned embodiments benefit from an increase in size. The larger the O.U.B.H.E.L.P. the more volume of fluid contained within. So, for the same volume of displaced fluid, either by compressed gas injected or by a fixed volume hollow piston, O.U.B.H.E.L.P. can produce a given amount of electricity for a longer duration due to a longer ascent and descent cycle.

The electrical output capacity of O.U.B.H.E.L.P. is also governed by the volume of fluid displaced within O.U.B.H.E.L.P. The larger the volume of displaced fluid, the greater the buoyancy force, the greater the pressure of the fluid above the buoyancy force as it ascends, and therefore the greater the kinetic energy of the fluid passing through the hydro turbine. Greater kinetic energy means that a larger electrical generator can be coupled to the hydro turbine, and therefore greater overall electrical output can be obtained.

Detailed Description of Embodiment "A"

Drawings FIG. 1, FIG. 5, FIG. 6, FIG. 17, FIG. 18, FIG. 19, and FIG. 20 can be referenced to for this embodiment.

O.U.B.H.E.L.P. is a hydroelectric power plant comprising a generally vertical elongated main vessel 106 and a generally vertical elongated other vessel 108. The two vessels are connected at the bottom to a fluid crossover section 198. Main vessel 106 is connected near top to a hydro turbine 136 by a main inlet pipe 138. Other vessel 108 is connected near top to hydro turbine 136 by an other outlet pipe 144. The system is filled with a fluid 102 so as to create a fluid loop. This fluid loop allows for fluid 102 flow between main vessel 106 and other vessel 108 at both bottom and near top. Hydro turbine 136 constitutes a flow energy converter. Fluid 102 within main vessel 106 constitutes a main fluid column. Fluid 102 within other vessel 108 constitutes an other fluid column.

A main piston 110 is disposed slidably with minimal clearance within main vessel 106. Main piston 110 can be constructed in one piece or in segments so as to be assembled within main vessel 106. Main piston 110 constitutes a main separation means. A piston seal 200 is fitted to piston 110. A piston upper shock absorber 190 is fitted to the top of piston 110 and a piston lower shock absorber 192 is fitted to the bottom of piston 110. A piston upper magnetic ring 194 is fitted to the top of upper shock absorber 190 and a piston lower magnetic ring 196 is fitted to the bottom of lower shock absorber 192. Piston shock absorber fastening brackets 191 are utilized to connect upper shock absorber 190 and lower shock absorber 192 to piston 110.

A main upper electromagnet 114 is disposed within main vessel 106 near the top and a main lower electromagnet 116 is disposed within main vessel 106 near the bottom. Electromagnet electrical conduit 214 is disposed through a wall of main vessel 106. Electromagnet fastening brackets 115 are utilized to fasten electromagnet 114 and electromagnet 116 within vessel 106. Main upper electromagnet 114 and main lower electromagnet 116 constitute a main upper securing means and a main lower securing means respectively.

A main compressed gas inlet orifice 123 is disposed through the wall of main vessel 106 at a location just below lower electromagnet 116. Compressed gas orifice 123 is connected outside of main vessel 106 to a main compressed gas inlet pipe 122 that is connected to a compressed gas supply source (not shown). A main compressed gas inlet valve 126 is disposed within pipe 122. Main compressed gas inlet orifice 123 constitutes main compressed gas injection means. Compressed gas 104 is utilized to create a compressed gas pocket 105.

A main compressed gas evacuation orifice 154 is disposed through the wall of main vessel 106 at a location just below the underside of main piston 110 while it is docked with upper electromagnet 114. Main evacuation orifice 154 is connected outside of main vessel 106 to a main compressed gas evacuation pipe 162 that can be connected to a turbo expander (not shown). A main compressed gas evacuation valve 158 is disposed within evacuation pipe 162. Main compressed gas evacuation orifice 154 constitutes a main compressed gas evacuation means.

A reservoir 130 is disposed outside of other vessel 108, and is located and connected near top of other vessel 108.

An other atmospheric air valve 188 is disposed at the top of other vessel 108.

A main top cap 176 is disposed at the top of main vessel 106.

An other top cap 178 is disposed at the top of other vessel 108.

A main human access hatch 180 is disposed through main top cap 176.

An other human access hatch 182 is disposed through other top cap 178.

A lower human access hatch 184 is disposed through the side of fluid crossover section 198.

A drain valve 174 is disposed through the bottom of fluid crossover section 198.

Detailed Operation of Embodiment "A"

Main top cap 176 disposed at the top of main vessel 106 is removable so as to allow complete access to the inside of main vessel 106 for insertion of main piston 110 or for any other purposes requiring a large opening.

Other top cap 178 disposed at the top of other vessel 108 is removable so as to allow complete access to the inside of other vessel 108 for any purpose requiring a large opening.

Main human access hatch 180 disposed through main top cap 176 allows for human entry into the top section of main vessel 106.

Other human access hatch 182 disposed through other top cap 178 allows for human entry into the top section of other vessel 108.

Lower human access hatch 184 disposed through the side of fluid crossover section 198 allows for humans to enter the lower section of O.U.B.H.E.L.P.

Electromagnet electrical conduit 214 is utilized to power electromagnet 114 and electromagnet 116.

Drain valve 174 disposed through the bottom of fluid crossover section 198 allows for complete fluid 102 drain.

Piston seal 200 allows for a good compressed gas 104 and fluid 102 tight seal within vessel 106.

To start an ascent cycle, piston 110 is docked with lower electromagnet 116. Electromagnet 116 secures piston 110 in place by direct contact with piston lower magnetic ring 196 through electromagnetism.

While piston 110 is docked with lower electromagnet 116, main compressed gas inlet valve 126 is opened and compressed gas 104 is injected into main vessel 106 through main compressed gas inlet orifice 123. This creates compressed gas pocket 105 at the underside of piston 110. After a predetermined volume of compressed gas 104 has been injected, valve 126 is closed.

Main piston 110 is then released from lower electromagnet 116. Piston 110 begins to ascend, forcing fluid 102 above piston 110 upward through main inlet pipe 138 then through hydro turbine 136. Fluid 102 then exits hydro turbine 136 through other outlet pipe 144 and into other vessel 108. Thusly resupplying fluid 102 within other vessel 108 and therefore also the source of gravity which allows for the buoyancy force.

As piston 110 ascends, compressed gas pocket 105 expands unhindered in a downwardly direction. This expansion continues until piston 110 has docked with upper electromagnet 114. Due to the continued expansion and subsequent increase in volume of displaced fluid 102 within O.U.B.H.E.L.P., an ever increasing buoyancy force is created during the ascent cycle which in turn creates a greater kinetic force within fluid 102 passing through hydro turbine 136.

Other atmospheric air valve 188 can be used to create an air tight system. After injection of compressed gas 104, closing atmospheric air valve 188 will suppress the expansion of compressed gas pocket 105 during the ascent cycle. Some expansion of compressed gas pocket 105 will still occur, creating an overall pressurized system. If atmospheric air valve 188 is left open, the increasing volume of displaced fluid 102 within the system during the ascent cycle is allowed to flow into reservoir 130 for temporary storage.

When piston 110 docks with upper electromagnet 114, upper shock absorber 190 helps cushion the docking process, then upper electromagnet 114 is turned on and secures piston 110 in place. While docked, evacuation valve 158 is opened and compressed gas pocket 105 is forced out of main vessel 106 by the gravitational force of the fluid 102 within other vessel 108. After complete evacuation, valve 158 is closed.

During the evacuation the displaced fluid 102 that is temporarily stored in reservoir 130 flows out of reservoir 130 and back into other vessel 108.

Piston 110 is then released from upper electromagnet 114 to begin a descent cycle. Piston 110 being of sufficient negative buoyancy to urge fluid 102 below and in turn fluid 102 within other vessel 108 upward back through other outlet pipe 144 then hydro turbine 136 and through main inlet pipe 138 and into main vessel 106. In this embodiment, this descent cycle is of little force and does not produce energy, it only allows for fluid 102 above piston 110 to be resupplied.

Piston 110 descends and docks with lower electromagnet 116. Piston lower shock absorber 192 helps to cushion the docking process. Electromagnet 116 secures piston 110, thusly ending a complete cycle of the system.

The whole process is repeated in this manner for 24 hours a day and 365 days a year. No wind or sunny days required. Completely green energy and all we have to do is build it.

Detailed Description of Embodiment "B"

Figure 2:
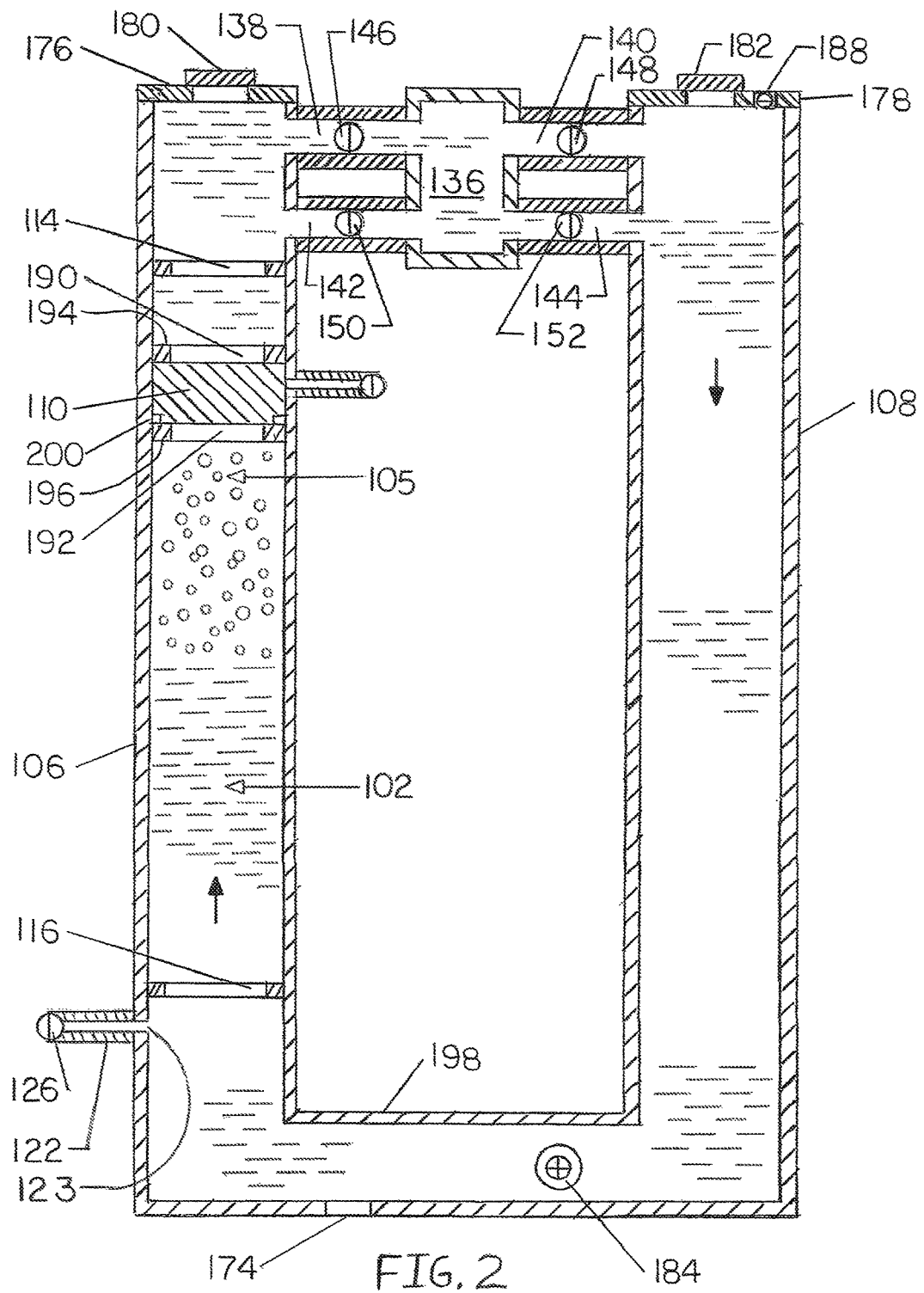
FIG. 2 is a front elevation cross-sectional view of embodiment "B" and is referenced by section lines 2-2 in FIG. 7. It is a depiction of a main piston ascending.
Figure 3:
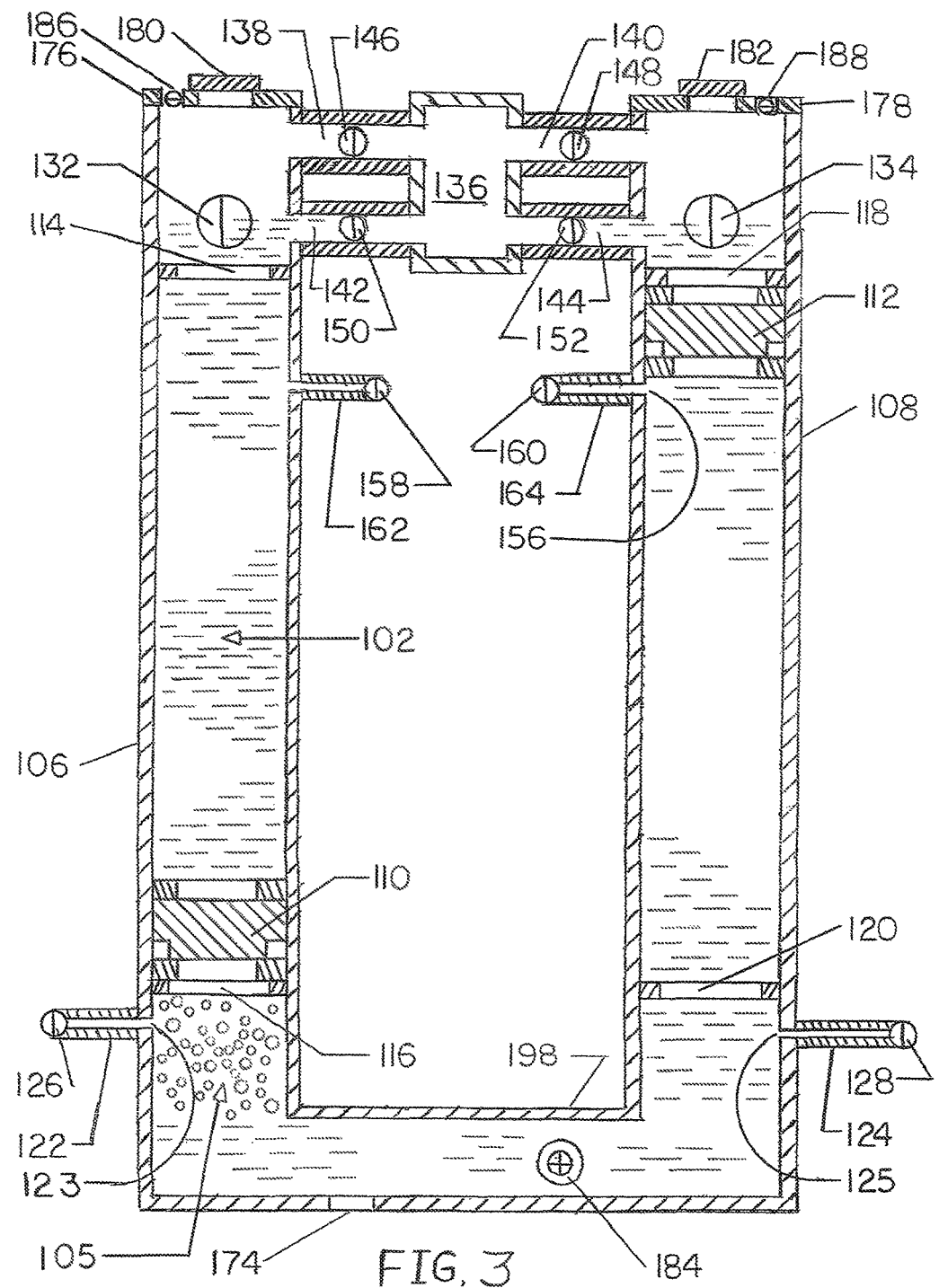
FIG. 3 is a front elevation cross-sectional view of embodiment "C" and is referenced by section lines 3-3 in FIG. 8. It is a depiction of a main piston docked with a main lower electromagnet and compressed gas injected at its underside. It also depicts an other piston docked with an other upper electromagnet.
Figure 4:
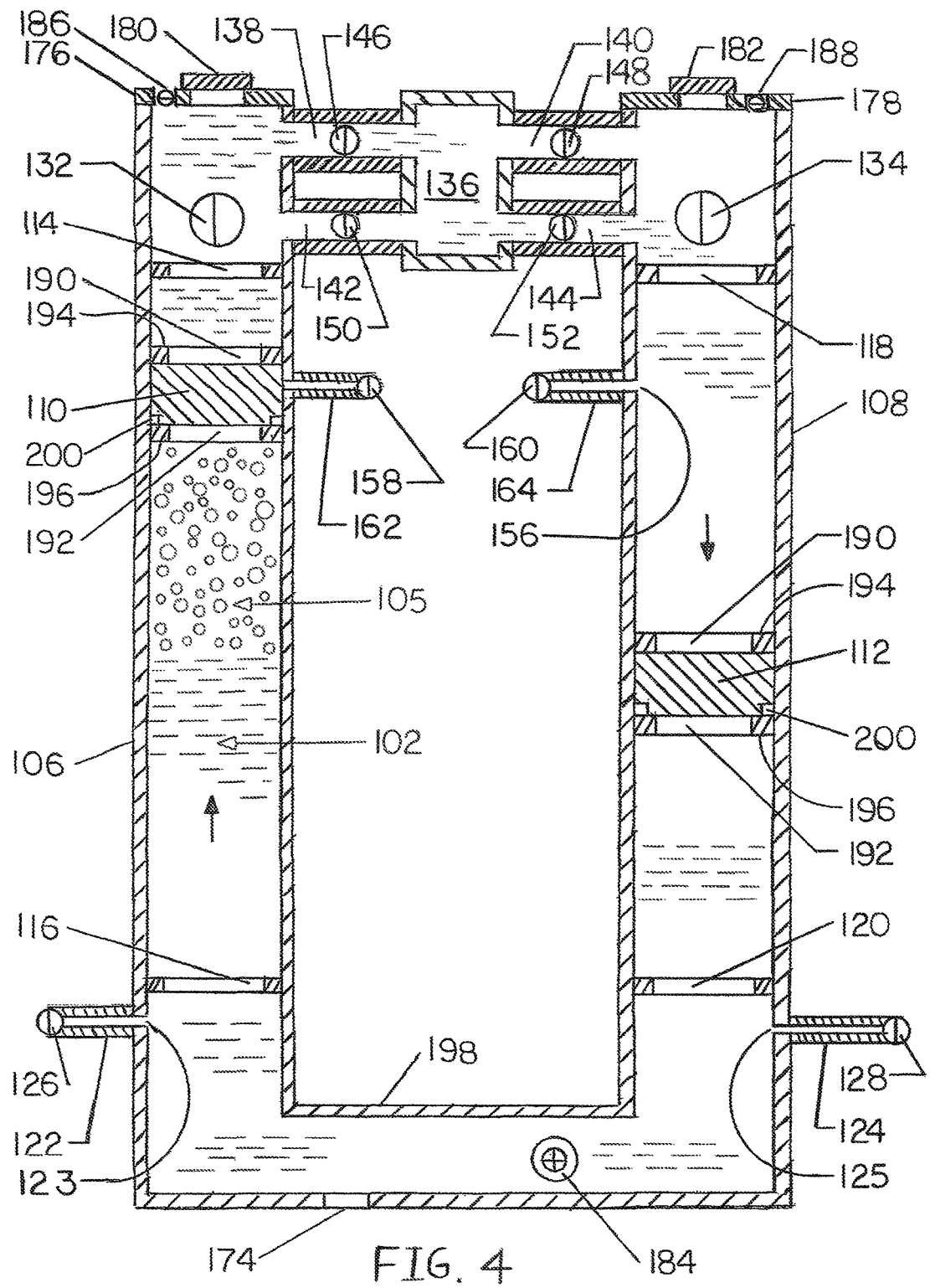
FIG. 4 is a front elevation cross-sectional view of embodiment "C" and is referenced by section lines 3-3 in FIG. 8. It is a depiction of a main piston ascending with a compressed gas pocket at its underside. It also depicts an other piston descending.
Figure 5:
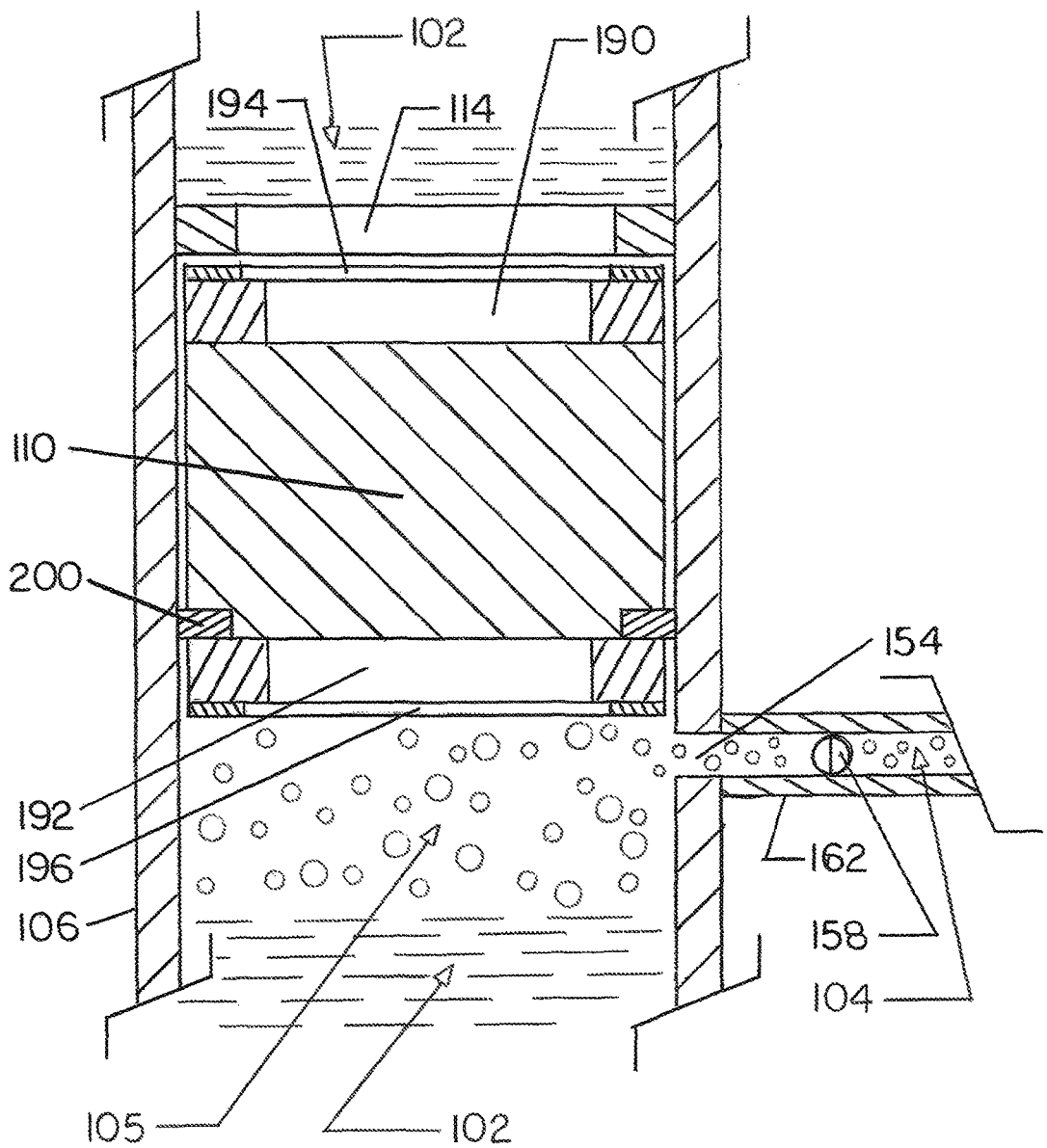
FIG. 5 is an enlarged front elevation cross-sectional view which depicts a main piston docked with a main upper electromagnet and the compressed gas pocket being evacuated from the underside of the main piston. This can be referenced to for embodiments "A", "B", and "C"
Figure 6:
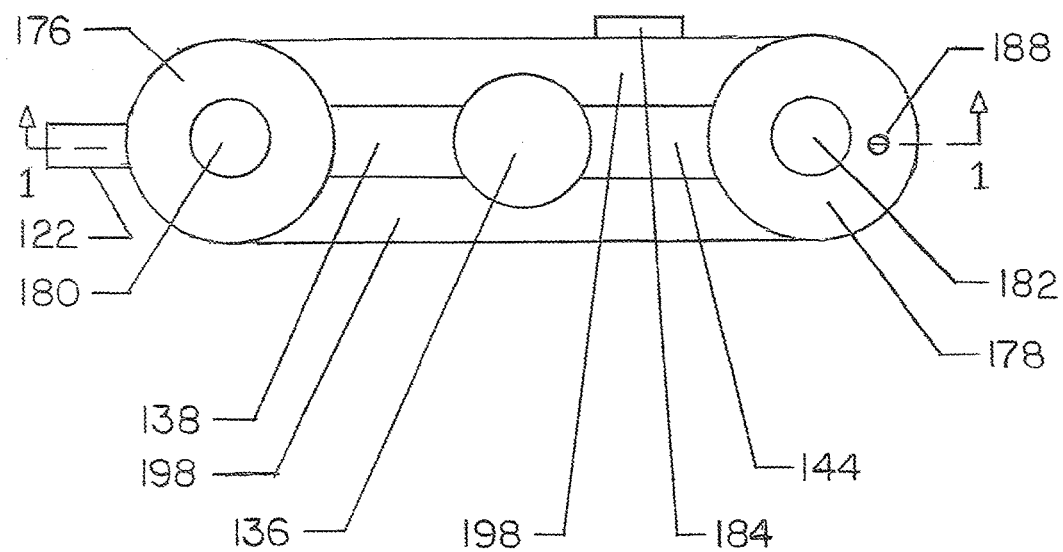
FIG. 6 is a plan view of embodiment "A"
Figure 7:
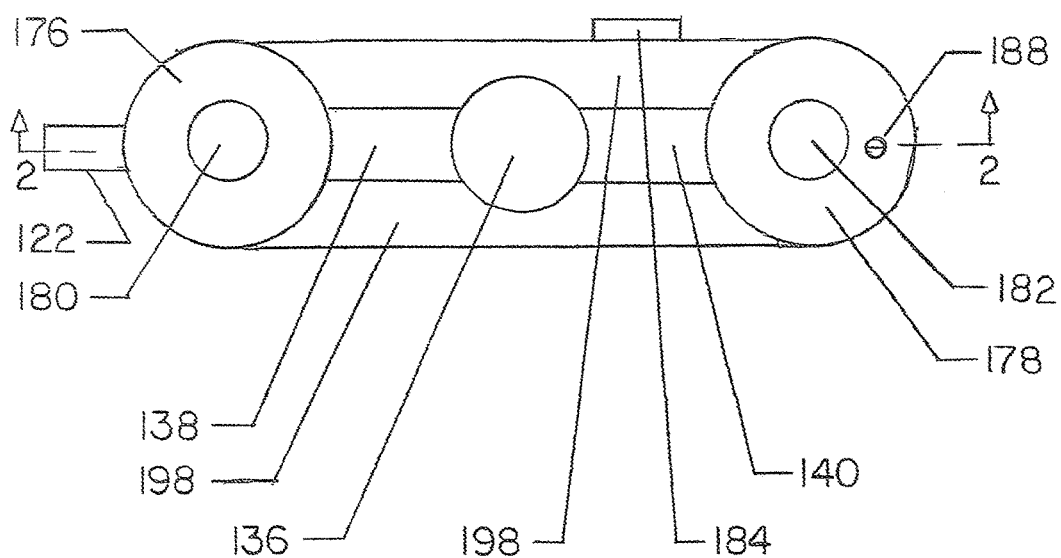
FIG. 7 is a plan view of embodiment "B"
Figure 8:
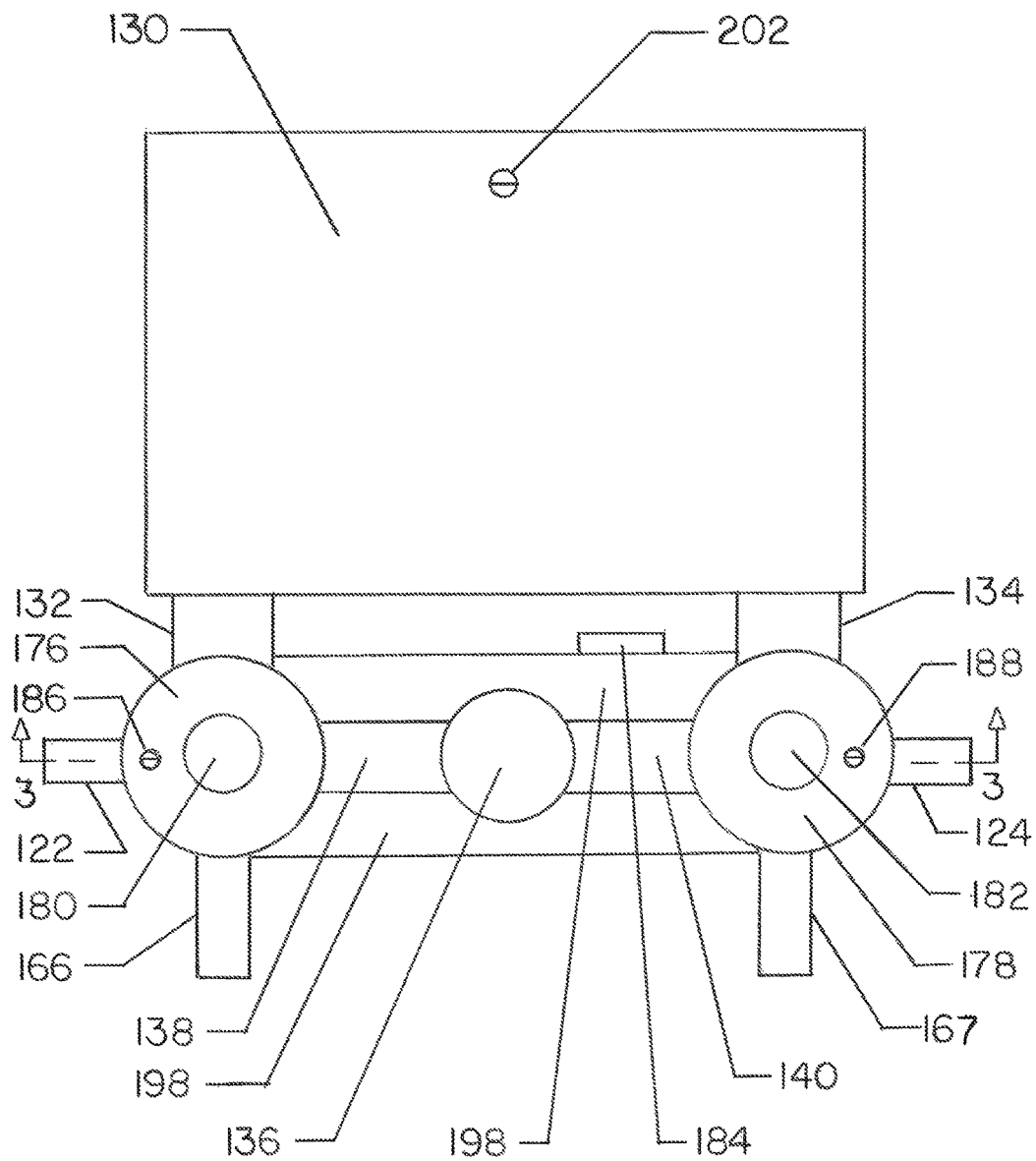
FIG. 8 is a plan view of embodiment "C"
Figure 9:
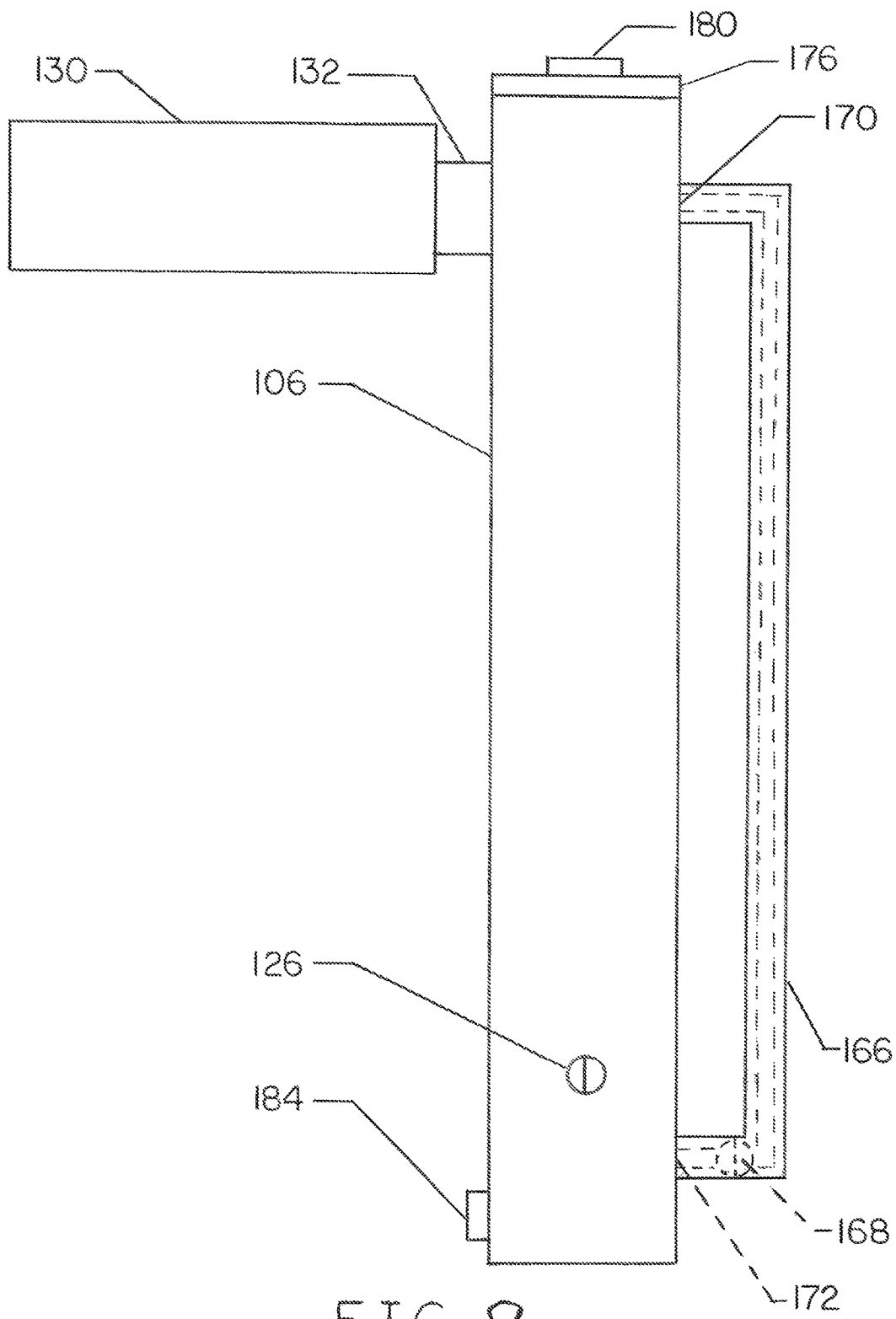
FIG. 9 is a left side elevation view of embodiment "C"
Figure 10:
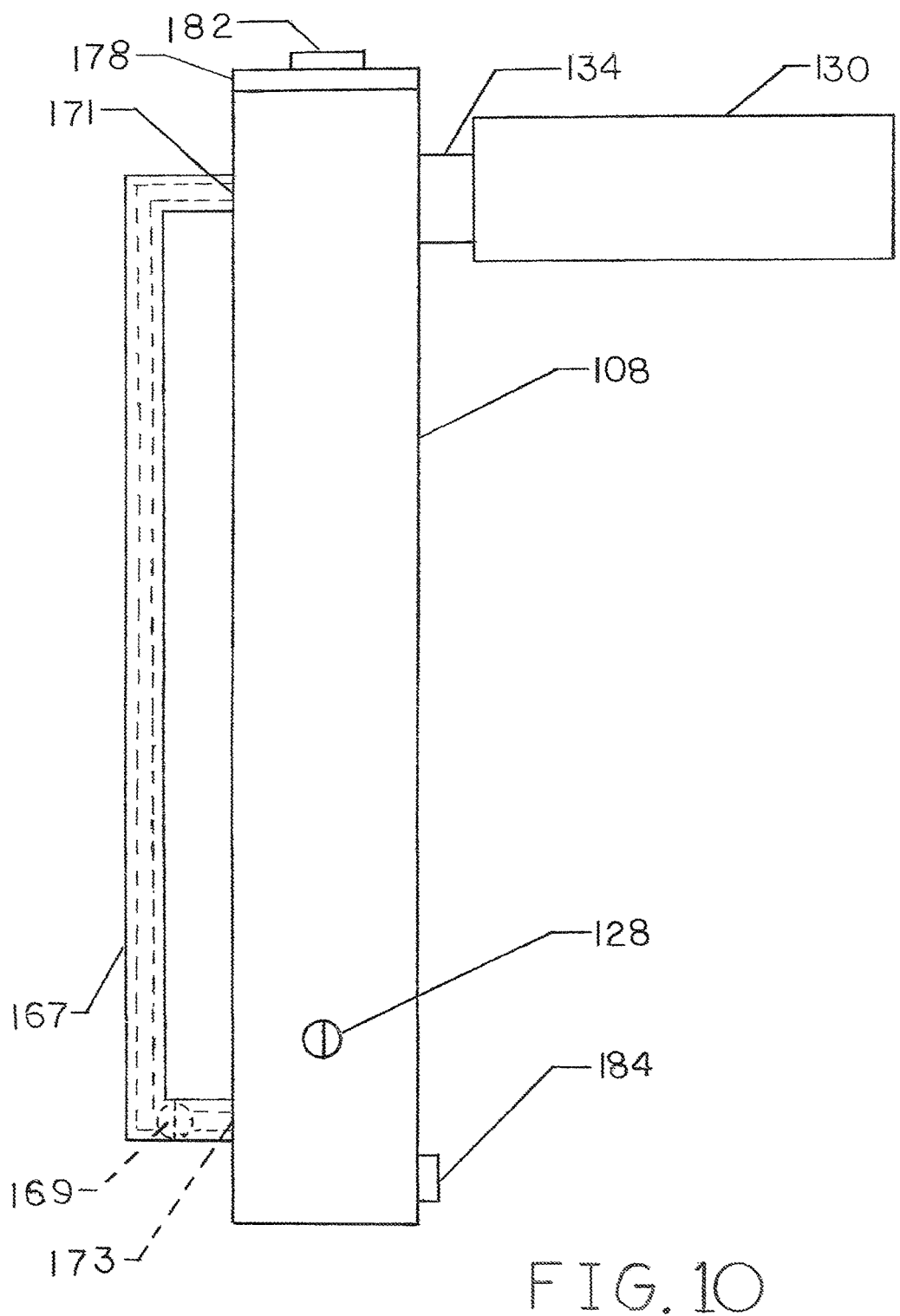
FIG. 10 is a right side elevation view of embodiment "C"
Figure 11:
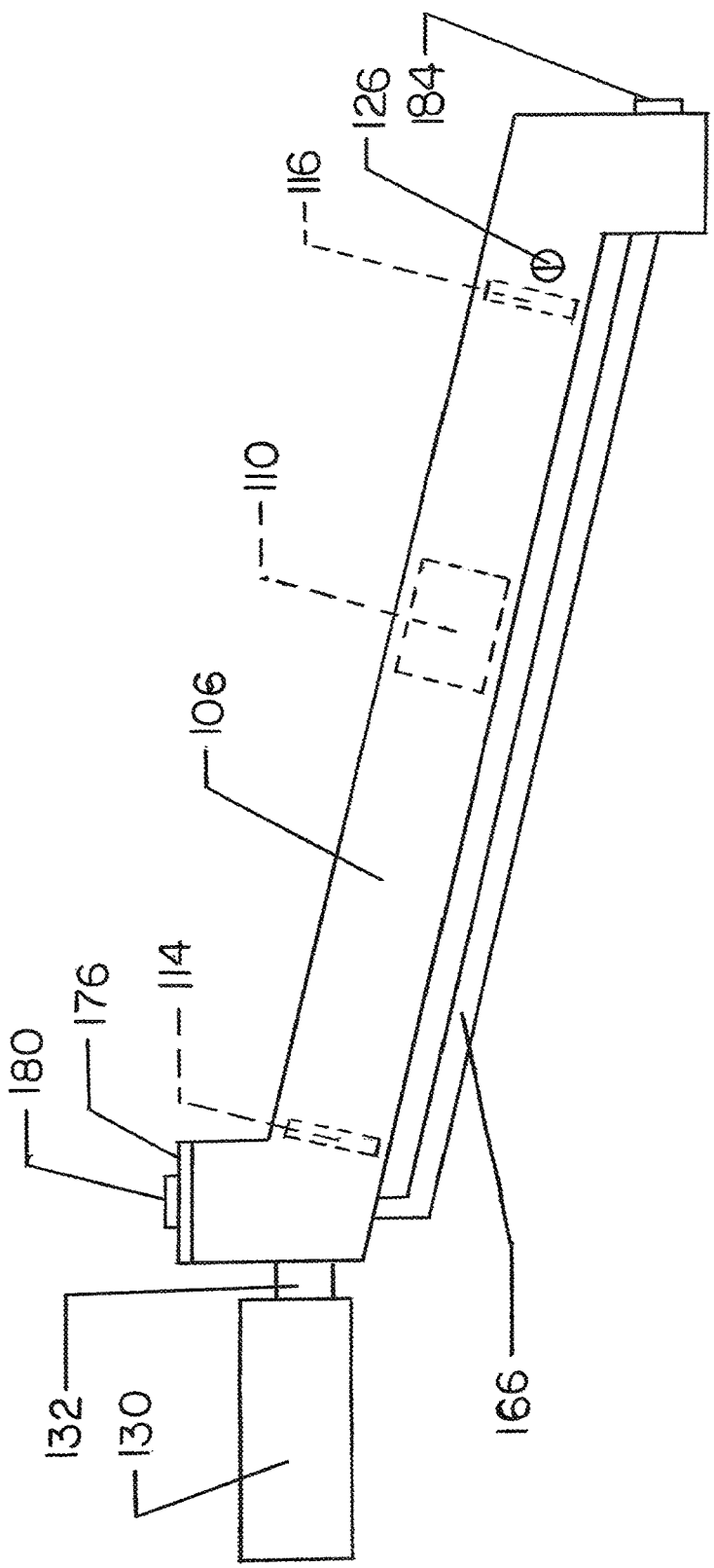
FIG. 11 is a left side elevation view of embodiment "D" erected at a low degree of angle.
Figure 12:
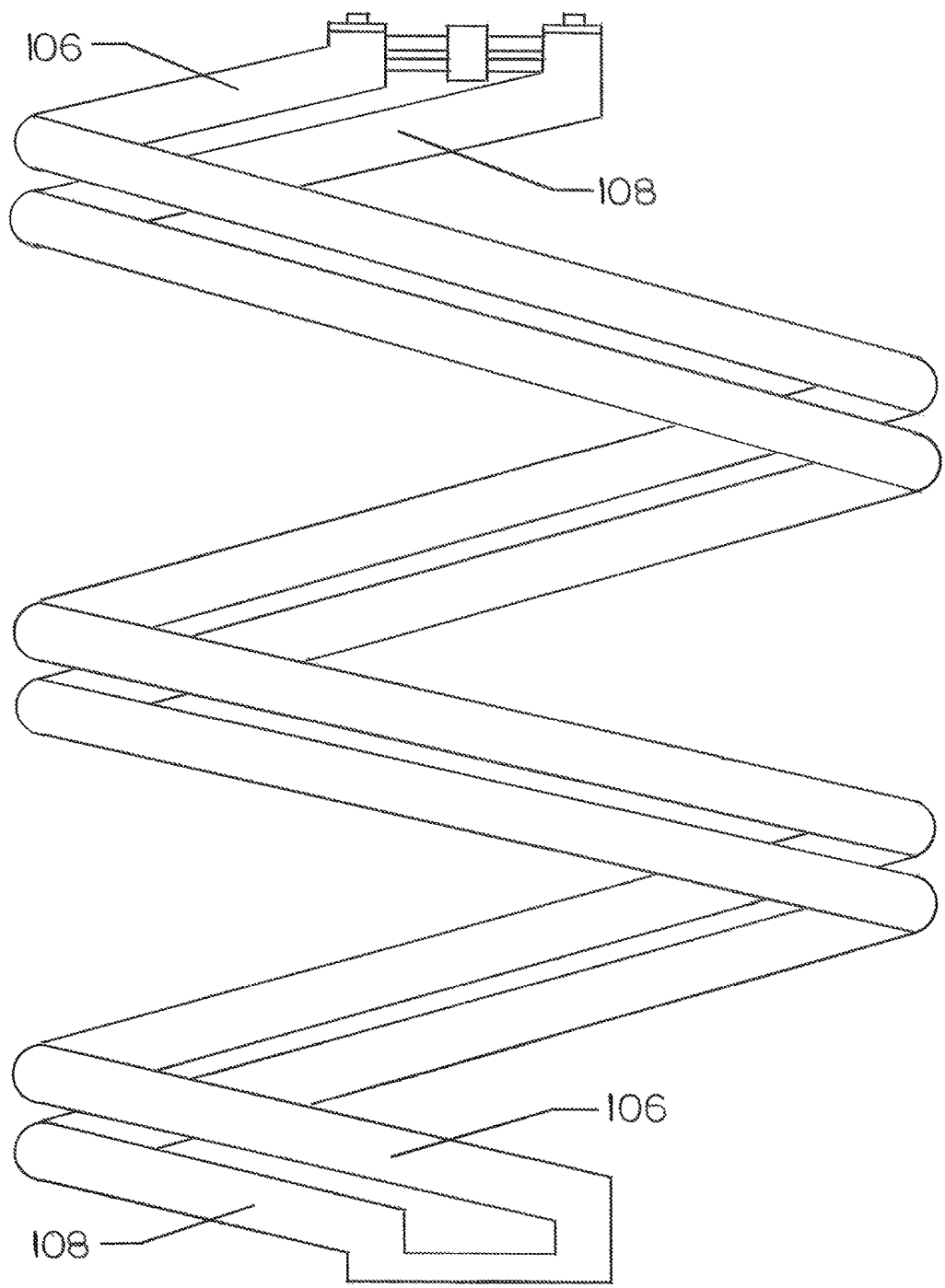
FIG. 12 is a front elevation view of embodiment "E"

Drawings FIG. 2, FIG. 5, and FIG. 7 can be referenced to for this embodiment.

This embodiment has all the same features as embodiment "A" with a few additions.

A main outlet pipe 142 is connected to main vessel 106 near top and to hydro turbine 136 and an other inlet pipe 140 is connected to other vessel 108 near top and to hydro turbine 136.

A main inlet valve 146 is disposed within main inlet pipe 138. A main outlet valve 150 is disposed within main outlet pipe 142. An other inlet valve 148 is disposed within other inlet pipe 140. An other outlet valve 152 is disposed within other outlet pipe 144.

An other reservoir valve 134 is disposed between reservoir 130 and other vessel 108.

Main piston 110 is heavily negatively buoyant.

Detailed Operation of Embodiment "B"

The operation of this embodiment is much the same as embodiment "A" with the following additions.

While piston 110 is in an ascent cycle, main outlet valve 150 is closed and other inlet valve 148 is closed, also, main inlet valve 146 is open and other outlet valve 152 is open, and other reservoir valve 134 is open, thusly guiding fluid 102 flow during the main ascent cycle.

While piston 110 is in a descent cycle, main outlet valve 150 is open and other inlet valve 148 is open, also, main inlet valve 146 is closed and other outlet valve 152 is closed, and other reservoir valve 134 is closed, thusly guiding fluid 102 flow during the main descent cycle.

Due to the heavily negative buoyancy of piston 110 it exerts a great gravity force during the main descent cycle forcing fluid 102 below piston 110 downward and fluid 102 within other vessel 108 upward through other inlet pipe 140 and through hydro turbine 136, exiting through main outlet pipe 142 and into main vessel 106.

Due to the heavy weight of piston 110, a larger volume of compressed gas 104 is required to compensate for the added weight. However, this heavy piston 110 will produce energy during the descent cycle through its extra gravitational force.

Detailed Description of Embodiment "C"

This embodiment contains the features of embodiment "A" and most features of embodiment "B". With all the additional features of this embodiment and trying to reference back to the previous embodiments, I feel it may be a little confusing to just cite the additions. Therefore, in the interests of clarity, this embodiment does not reference to other embodiments and is cited as if anew. This will also give the reader a fresh start which may allow for a better understanding of O.U.B.H.E.L.P. and its functions.

Drawings FIG. 3, FIG. 4, FIG. 5, FIG. 8, FIG. 9, and FIG. 10 can be referenced to for this embodiment.

This embodiment of O.U.B.H.E.L.P. is a twin piston hydroelectric power plant comprising generally vertical elongated main vessel 106 and generally vertical elongated other vessel 108. Main vessel 106 and other vessel 108 are connected at bottom to fluid crossover section 198. Main vessel 106 is connected near top to hydro turbine 136 by main inlet pipe 138 and main outlet pipe 142. Other vessel 108 is connected near top to hydro turbine 136 by other outlet pipe 144 and other inlet pipe 140. The system is filled with fluid 102 so as to create a fluid loop. This fluid loop allows for fluid 102 flow between main vessel 106 and other vessel 108 at both bottom and near top.

Main inlet valve 146 is disposed within main inlet pipe 138. Main outlet valve 150 is disposed within main outlet pipe 142. Other inlet valve 148 is disposed within other inlet pipe 140. Other outlet valve 152 is disposed within other outlet pipe 144.

Main piston 110 is disposed slidably with minimal clearance within main vessel 106. Piston 110 can be constructed in one piece or in segments so as to be assembled within main vessel 106 and can be of near neutral or negative buoyancy. Piston seal 200 is fitted to piston 110. Piston upper shock absorber 190 is fitted to the top of piston 110 and piston lower shock absorber 192 is fitted to the bottom of piston 110. Piston upper magnetic ring 194 is fitted to the top of piston upper shock absorber 190 and piston lower magnetic ring 196 is fitted to the bottom of piston lower shock absorber 192.

An other piston 112 is disposed slidably with minimal clearance within other vessel 108. Other piston 112 can be constructed in one piece or in segments so as to be assembled within other vessel 108 and can be of near neutral or negative buoyancy. Other piston 112 constitutes an other separation means. Piston seal 200 is fitted to piston 112. Upper shock absorber 190 is fitted to the top of piston 112 and lower shock absorber 192 is fitted to the bottom of piston 112. Upper magnetic ring 194 is fitted to the top of upper shock absorber 190 and lower magnetic ring 196 is fitted to the bottom of lower shock absorber 192.

Main upper electromagnet 114 is disposed within main vessel 106 near the top and main lower electromagnet 116 is disposed within main vessel 106 near the bottom. Main upper electromagnet 114 constitutes main upper securing means. Main lower electromagnet 116 constitutes main lower securing means.

An other upper electromagnet 118 is disposed within other vessel 108 near the top and an other lower electromagnet 120 is disposed within other vessel 108 near the bottom. Other upper electromagnet 118 constitutes an other upper securing means. Other lower electromagnet 120 constitutes an other lower securing means.

Main compressed gas inlet orifice 123 is disposed through the wall of main vessel 106 at a location just below lower electromagnet 116. Compressed gas orifice 123 is connected outside of main vessel 106 to main compressed gas inlet pipe 122 that is connected to a compressed gas supply source (not shown). Main compressed gas inlet valve 126 is disposed within gas inlet pipe 122. Main compressed gas inlet orifice 123 constitutes a main compressed gas injection means.

An other compressed gas inlet orifice 125 is disposed through the wall of other vessel 108 at a location just below lower electromagnet 120. Compressed gas orifice 125 is connected outside of other vessel 108 to an other compressed gas inlet pipe 124 that is connected to a compressed gas supply source (not shown). An other compressed gas inlet valve 128 is disposed within gas inlet pipe 124. Other compressed gas inlet orifice 125 constitutes an other compressed gas injection means.

Main compressed gas evacuation orifice 154 is disposed through the wall of main vessel 106 at a location just below the underside of piston 110 while it is docked with upper electromagnet 114. Main evacuation orifice 154 is connected outside of main vessel 106 to main compressed gas evacuation pipe 162 that can be connected to a turbo expander (not shown). Main compressed gas evacuation valve 158 is disposed within evacuation pipe 162. Main compressed gas evacuation orifice 154 constitutes main compressed gas evacuation means.

An other compressed gas evacuation orifice 156 is disposed through the wall of other vessel 108 at a location just below the underside of piston 112 while it is docked with upper electromagnet 118. Other evacuation orifice 156 is connected outside of other vessel 108 to an other compressed gas evacuation pipe 164 that can be connected to a turbo expander (not shown).

An other compressed gas evacuation valve 160 is disposed within evacuation pipe 164. Other compressed gas evacuation orifice 156 constitutes an other compressed gas evacuation means.

Reservoir 130 is disposed outside of main vessel 106 and other vessel 108 and is shared by both. Reservoir 130 is located and connected near top of main vessel 106 and other vessel 108. A main reservoir valve 132 is disposed between reservoir 130 and main vessel 106. Other reservoir valve 134 is disposed between reservoir 130 and other vessel 108.

A main atmospheric air valve 186 is disposed at the top of main vessel 106. Other atmospheric air valve 188 is disposed at the top of other vessel 108. A reservoir atmospheric air valve 202 is disposed at the top of reservoir 130.

A main fluid bypass pipe 166 is disposed outside of main vessel 106 with the top end connected to a main upper fluid bypass orifice 170 through the wall of main vessel 106 at a location just above upper electromagnet 114, and with the bottom end connected to a main lower fluid bypass orifice 172 through the wall of main vessel 106 at a location just below lower electromagnet 116. A main fluid bypass valve 168 is disposed within fluid bypass pipe 166.

An other fluid bypass pipe 167 is disposed outside of other vessel 108 with the top end connected to an other upper fluid bypass orifice 171 through the wall of other vessel 108 at a location just above upper electromagnet 118, and with the bottom end connected to an other lower fluid bypass orifice 173 through the wall of other vessel 108 at a location just below lower electromagnet 120. An other fluid bypass valve 169 is disposed within fluid bypass pipe 167.

Main top cap 176 is disposed at the top of main vessel 106.

Other top cap 178 is disposed at the top of other vessel 108.

Main human access hatch 180 is disposed through main top cap 176.

Other human access hatch 182 is disposed through other top cap 178.

Lower human access hatch 184 is disposed through the side of fluid crossover section 198.

Drain valve 174 is disposed through the bottom of fluid crossover section 198.

Detailed Operation of Embodiment "C"

Main top cap 176 disposed at the top of main vessel 106 is removable so as to allow complete access to the inside of main vessel 106 for insertion of piston 110 or for any other purposes requiring a large opening.

Other top cap 178 disposed at the top of other vessel 108 is removable so as to allow complete access to the inside of other vessel 108 for insertion of piston 112 or for any other purposes requiring a large opening.

Main human access hatch 180 disposed through main top cap 176 allows for human entry into the top section of vessel 106.

Other human access hatch 182 disposed through other top cap 178 allows for human entry into the top section of vessel 108.

Lower human access hatch 184 disposed through the side of fluid crossover section 198 allows for humans to enter the lower section of O.U.B.H.E.L.P.

Drain valve 174 disposed through the bottom of fluid crossover section 198 allows for complete fluid 102 drain.

Piston seal 200 allows for a good compressed gas 104 and fluid 102 tight seal within vessels 106 and 108.

To start an ascent cycle, main piston 110 is docked with main lower electromagnet 116. Electromagnet 116 secures piston 110 in place by direct contact with lower magnetic ring 196 through electromagnetism.

While main piston 110 is docked with lower electromagnet 116, main compressed gas valve 126 is opened and compressed gas 104 is injected into main vessel 106 through main compressed gas orifice 123. This creates compressed gas pocket 105 at the underside of piston 110. After a predetermined volume of compressed gas 104 has been injected, valve 126 is closed.

Before piston 110 begins an ascent cycle, main outlet valve 150 is closed and other inlet valve 148 is closed, also, main inlet valve 146 is open and other outlet valve 152 is open. Also, main reservoir valve 132 is closed and other reservoir valve 134 is open. Thusly all valves guide fluid 102 flow during the main ascent cycle.

Piston 110 is then released from lower electromagnet 116. Piston 110 begins to ascend, forcing fluid 102 above piston 110 upward through main inlet pipe 138 then through hydro turbine 136. Fluid 102 then exits hydro turbine 136 through other outlet pipe 144 and into other vessel 108. Thusly resupplying fluid 102 within other vessel 108 and therefore also the source of gravity which allows for the buoyancy force.

As piston 110 ascends, compressed gas pocket 105 expands unhindered in a downward direction. This expansion continues until piston 110 has docked with upper electromagnet 114. Due to the continued expansion and subsequent increase in volume of displaced fluid 102 within O.U.B.H.E.L.P., an ever increasing buoyancy force is created during the ascent cycle which in turn creates a greater kinetic force within fluid 102 passing through hydro turbine 136.

Atmospheric air valves 186, 188, and 202 can be used to create an air tight system if so desired. After injection of compressed gas 104, closing atmospheric air valves 186, 188, and 202 will suppress the expansion of compressed gas pocket 105 during the ascent cycle. Some expansion of compressed gas pocket 105 will still occur, creating an overall pressurized system. If atmospheric air valves 186, 188, 202 are left open, the increasing volume of displaced fluid 102 within the system during the ascent cycle is allowed to flow into reservoir 130 for temporary storage.

Before piston 110 docks with upper electromagnet 114, main inlet valve 146 adjusts to slow fluid 102 flow and in turn slows the ascent of piston 110 to ease the docking procedure. When piston 110 docks with upper electromagnet 114, upper shock absorber 190 also helps to cushion the docking process, then upper electromagnet 114 is turned on and secures piston 110 in place. While docked, compressed gas evacuation valve 154 is opened and compressed gas pocket 105 is forced out of main vessel 106 by the gravitational force of fluid 102 within other vessel 108. After complete evacuation, valve 154 is closed.

During the evacuation the displaced fluid 102 that is temporarily stored in reservoir 130 flows out of reservoir 130 and back into other vessel 108.

Other piston 112 is now docked with other lower electromagnet 120 after completing a descent cycle and is being prepared to start an ascent cycle. Electromagnet 120 secures piston 112 in place by direct contact with lower magnetic ring 196 through electromagnetism.

While piston 112 is docked with lower electromagnet 120, other compressed gas inlet valve 128 is opened and compressed gas 104 is injected into other vessel 108 through other compressed gas inlet orifice 125. This creates compressed gas pocket 105 at the underside of piston 112. After a predetermined volume of compressed gas 104 has been injected, valve 128 is closed.

Before piston 112 begins an ascent cycle, other outlet valve 152 is closed and main inlet valve 146 is closed, also, other inlet valve 148 is opened and main outlet valve 150 is opened. Also, other reservoir valve 134 is closed and main reservoir valve 132 is opened. Thusly all valves guide fluid 102 flow during the ascent cycle of piston 112.

Main piston 110 is then released from upper electromagnet 114 to begin a descent cycle, and simultaneously, other piston 112 is released from lower electromagnet 120 to begin an ascent cycle. Other piston 112 begins to ascend, forcing fluid 102 above piston 112 upward through other inlet pipe 140 then through hydro turbine 136. Fluid 102 then exits hydro turbine 136 through main outlet pipe 142 and into main vessel 106. Thusly resupplying fluid 102 within main vessel 106 and therefore also the source of gravity which allows for the buoyancy force.

As other piston 112 ascends, compressed gas pocket 105 expands unhindered in a downward direction. This expansion continues until other piston 112 has docked with upper electromagnet 118. Due to the continued expansion and subsequent increase in volume of displaced fluid 102 within O.U.B.H.E.L.P., an ever increasing buoyancy force is created during the ascent cycle which in turn creates a greater kinetic force within fluid 102 passing through hydro turbine 136.

During the ascent cycle of piston 112 the displaced volume of fluid 102 is allowed to flow through main reservoir valve 132 and into reservoir 130 for temporary storage.

During the ascent cycle of other piston 112, main piston 110 is in a descent cycle.

Before other piston 112 docks with upper electromagnet 118, other inlet valve 148 adjusts to slow fluid 102 flow and in turn slows the ascent of piston 112 to ease the docking process. When piston 112 docks with upper electromagnet 118, upper shock absorber 190 helps to cushion the docking process, then upper electromagnet 118 is turned on and secures piston 112 in place. While docked, evacuation valve 160 is opened and gas pocket 105 is forced out of other vessel 108 by the gravitational force of fluid 102 within main vessel 106. After complete evacuation, valve 160 is closed.

During the evacuation the displaced fluid 102 that is stored in reservoir 130 flows out of reservoir 130 through main reservoir valve 132 and back into main vessel 106.

After the evacuation of compressed gas 104 from the underside of other piston 112 has been completed and fluid 102 has flowed from reservoir 130 through main reservoir valve 132 and into main vessel 106, at this time, if main piston 110 has not docked with lower electromagnet 116, then main fluid bypass valve 168 is temporarily opened to allow fluid 102 to circumnavigate main piston 110 from below to above piston 110 so as to allow piston 110 to settle and dock with lower electromagnet 116.

When main piston 110 docks with lower electromagnet 116, lower shock absorber 192 helps to cushion the docking process, then lower electromagnet 116 secures piston 110, thusly ending a complete cycle of the system.

Through the powered ascent cycle of main piston 110 and the powered ascent cycle of other piston 112 this O.U.B.H.E.L.P. is a power house of clean electricity producing goodness.

The whole process is repeated in this manner for 24 hours a day and 365 days a year. Rainy or cloudy weather? No problem. Night time? No problem. No wind? No problem. All you need is water, compressed air and an O.U.B.H.E.L.P. O.U.B.H.E.L.P. is self-contained and a completely green energy producer and all we have to do, is build it.

Detailed Description and Operation of Embodiment "D"

Drawings FIG. 3, FIG. 4, FIG. 5, FIG. 8, FIG. 9, FIG. 10, and FIG. 11 can be referenced to for this embodiment.

This is more of a bring-to-your-attention-feature than it is a separate embodiment, and as you will see, it is well within the scope of the previous embodiments. Using embodiment "C" as an example, O.U.B.H.E.L.P. can be erected at a low degree of angle and still function properly. As long as compressed gas pocket 105 is at the underside of piston 110 or piston 112, and there is a supplied gravity force provided by fluid 102 within the accompanying main vessel 106 or other vessel 108, the buoyancy force will exert pressure on piston 110 or piston 112 in an upward direction, even if that upward direction is more horizontal than vertical. All operations of this embodiment function just as in embodiment "C".

Erecting O.U.B.H.E.L.P. on or under a naturally occurring low geological slope may equate to lower construction costs in comparison to a more vertically erected O.U.B.H.E.L.P. in regards to the accompanying support structure. Following the slope of the land will also allow O.U.B.H.E.L.P. to be constructed at a much greater length which would equate to a much larger capacity for electricity output, which again equates to greater efficiency. The length of main vessel 106 and other vessel 108 can be buried underground while leaving just the bottom fluid crossover section 198 above ground, and the top section above ground for access to hydro turbine 136 and reservoir 130. This would allow for a very small surface footprint for a large capacity power plant. The surface area over buried vessel 106 and buried vessel 108 could still be used for farming, grazing, or any other purpose that would not construct a permeant structure or bare an extreme heavy load directly above the vessels.

I believe this embodiment to be very feasible from a construction perspective if the stretch of land is not already occupied and is available. However, the middle of a highly populated city would prove a challenge to this embodiment, and O.U.B.H.E.L.P. erected in a more vertical fashion would be much more feasible amongst the skyscrapers.

Detailed Description and Operation of Embodiment "E"

Drawings FIG. 3, FIG. 4, FIG. 5, FIG. 8, FIG. 9, FIG. 10, and FIG. 12 can be referenced to for this embodiment.

This is also more of a bring-to-your-attention-feature than it is a separate embodiment, and as you will see, it is well within the scope of the previous embodiments. Using embodiment "C" again as an example, O.U.B.H.E.L.P. can be erected in a coil shape and still function properly. This also ties into that 'low degree of angle' that was just referred to. As long as compressed gas pocket 105 is at the underside of main piston 110 or other piston 112, and there is a supplied gravity force provided by fluid 102 within the accompanying main vessel 106 or other vessel 108, the buoyancy force will exert pressure on main piston 110 and other piston 112 in an upward direction, even if that upward direction is more horizontal than vertical. All operations of this embodiment function just as in embodiment "C".

This is a good one for the city dwellers. Erecting O.U.B.H.E.L.P. so that it encircles a skyscraper would not only be a great design feature, it would be a functioning green machine with the ability to supply the skyscraper with cleanly produced electricity. For the ecologically conscious architect this would be a heart throb. This embodiment also allows for a greater volume of fluid to be contained within each vertical unit of height erected compared to a generally vertical erected O.U.B.H.E.L.P.

Detailed Description of Embodiment "F"

Figure 13:
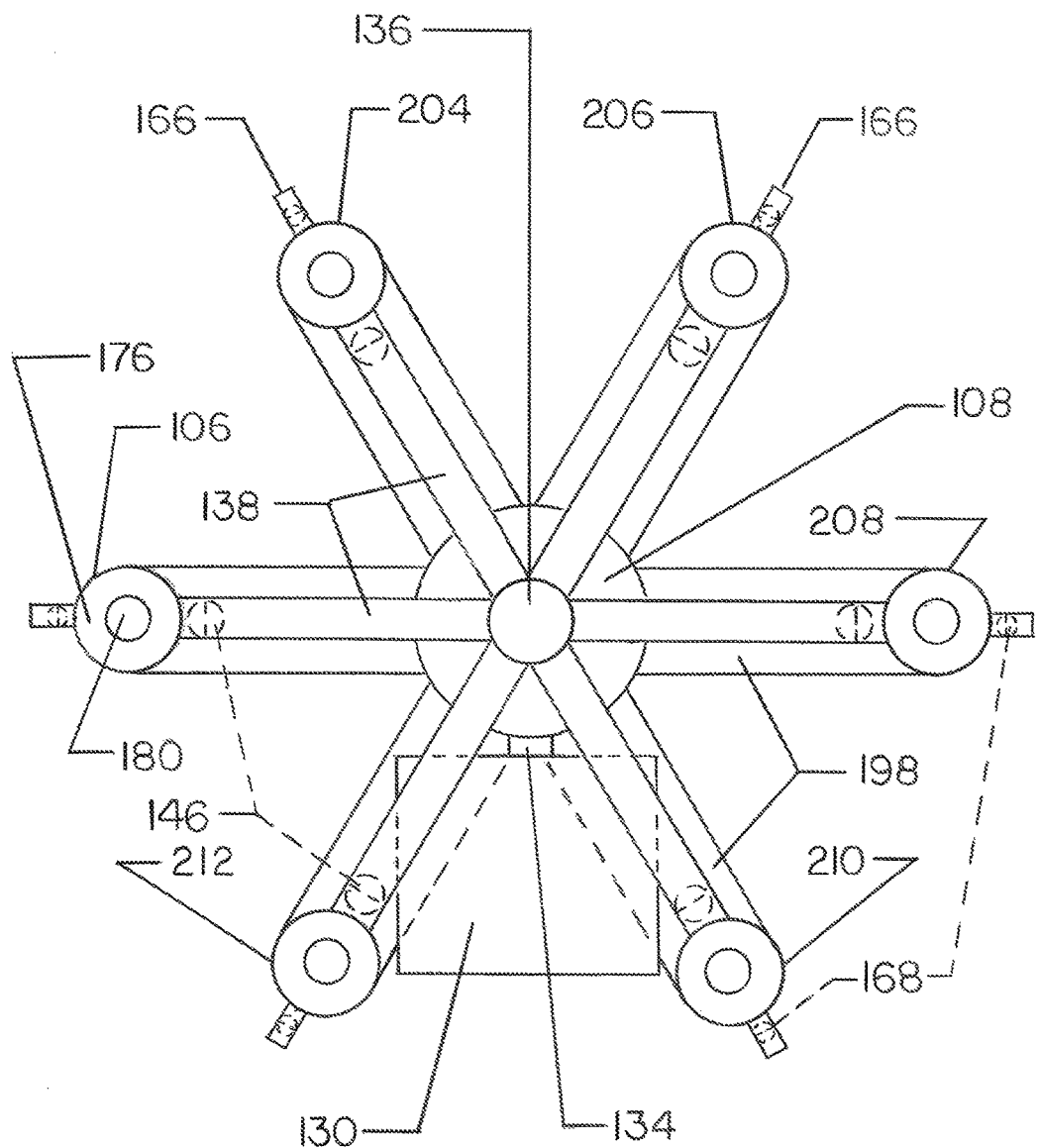
FIG. 13 is a plan view of embodiment "F"

Mainly drawing FIG. 13, however, if need be FIG. 1, and FIG. 5 which also show some aspects can be referenced to for this embodiment.

This O.U.B.H.E.L.P. comprises several generally vertical elongated main vessels 106, 204, 206, 208, 210, 212 and a single generally vertical elongated other vessel 108. Each main vessel 106, 204, 206, 208, 210, 212 is connected at the bottom to fluid crossover section 198 which in turn is connected to the bottom of other vessel 108. Each main vessel 106, 204, 206, 208, 210, 212 is connected near top to hydro turbine 136 by main inlet pipe 138, each main vessel 106, 204, 206, 208, 210, 212 having its own main inlet pipe 138. Each main inlet pipe 138 has main inlet valve 146 disposed within. Other vessel 108 is connected near top to hydro turbine 136 by other outlet pipe 144. The system is filled with fluid 102 so as to create a fluid loop between other vessel 108 and each individual main vessel 106, 204, 206, 208, 210, 212. These fluid loops allow for fluid 102 flow between each main vessel 106, 204, 206, 208, 210, 212 and other vessel 108 at both bottom and near top.

Main piston 110 is disposed slidably with minimal clearance within each main vessel 106, 204, 206, 208, 210, 212. Main pistons 110 can be constructed in one piece or in segments so as to be assembled within each main vessel 106, 204, 206, 208, 210, 212. Piston seal 200 is fitted to pistons 110. Piston upper shock absorber 190 is fitted to the top of main pistons 110. Piston lower shock absorber 192 is fitted to the bottom of main pistons 110. Piston upper magnetic ring 194 is fitted to the top of upper shock absorber 190 and piston lower magnetic ring 196 is fitted to the bottom of lower shock absorber 192.

Main upper electromagnet 114 is disposed within each main vessel 106, 204, 206, 208, 210, 212 near the top and main lower electromagnet 116 is disposed within each main vessel 106, 204, 206, 208, 210, 212 near the bottom.

Main compressed gas inlet orifice 123 is disposed through the wall of each main vessel 106, 204, 206, 208, 210, 212 at a location just below lower electromagnet 116. Compressed gas orifice 123 is connected outside of each main vessel 106, 204, 206, 208, 210, 212 to main compressed gas inlet pipe 122 that is connected to a compressed gas supply source (not shown). Main compressed gas inlet valve 126 is disposed within each inlet pipe 122.

Main compressed gas evacuation orifice 154 is disposed through the wall of each main vessel 106, 204, 206, 208, 210, 212 at a location just below the underside of each piston 110 while it is docked with upper electromagnet 114. Main evacuation orifice 154 is connected outside of each main vessel 106, 204, 206, 208, 210, 212 to main compressed gas evacuation pipe 162 that can be connected to a turbo expander (not shown). Main compressed gas evacuation valve 158 is disposed within each evacuation pipe 162.

Reservoir 130 is disposed outside of other vessel 108, and is located and connected near top of other vessel 108.

Other atmospheric air valve 188 is disposed at the top of other vessel 108.

Main fluid bypass pipe 166 is disposed outside of each main vessel 106, 204, 206, 208, 210, 212 with the top end connected to main upper fluid bypass orifice 171 through the wall of each main vessel 106, 204, 206, 208, 210, 212 at a location just above upper electromagnet 114, and with the bottom end connected to main lower fluid bypass orifice 172 through the wall of each main vessel 106, 204, 206, 208, 210, 212 at a location just below lower electromagnet 116. Main fluid bypass valve 168 is disposed within each bypass pipe 166.

Main top cap 176 is disposed at the top of main vessels 106, 204, 206, 208, 210, 212.

Main human access hatch 180 is disposed through each main top cap 176.

Detailed Operation of Embodiment "F"

The operation of this embodiment is very similar to that of embodiment "A" and as such I will try to just explain the general operation without too many duplicate details. By now you understand how O.U.B.H.E.L.P. generally functions.

This embodiment uses six main vessels 106, 204, 206, 208, 210, 212 in this example, however, more or less can be used. They have been depicted in an array pattern. However, they can also be arranged in banks or rows.

The depicted arrangement utilizes a single other vessel 108 surrounded by main vessels 106, 204, 206, 208, 210, 212. There are several modes of operation possible with this configuration.

Piston seal 200 allows for a good compressed gas 104 and fluid 102 tight seal within the main vessels 110.

During an ascent cycle, main inlet valves 146, for their respective ascending main pistons 110, would begin to close so as to restrict the fluid 102 flow above main pistons 110 so as to ease the docking process of those main pistons 110 to their respective upper electromagnet 114.

Reservoir 130 allows for temporary storage of fluid 102 displaced by the expanding compressed gas pockets 105 that are created at the underside of the main pistons 110. Fluid 102 flows into reservoir 130 from other vessel 108 during the expansion of the compressed gas pockets 105. During the evacuation of compressed gas pockets 105, the displaced fluid 102 within reservoir 130 flows out of reservoir 130 and into vessel 108.

Other atmospheric air valve 188 disposed at the top of other vessel 108 can be closed to suppress the expansion of compressed gas pockets 105.

One mode of operation would be to allow two main pistons 110 to ascend simultaneously, one within main vessel 106 and one within main vessel two 204, essentially doubling the fluid 102 flow through hydro turbine 136. So, while those two main pistons 110 ascend, two main pistons 110 would be descending simultaneously, one within main vessel three 206 and one within main vessel four 208, and two main pistons 110 would be having compressed gas 104 injected at their underside within main vessel five 210 and main vessel six 212. Main inlet valves 146 would be in an open position for ascending main pistons 110, while all the remaining inlet valves 146 would be in the closed position.

During the descent cycle for each main piston 110, the respective main inlet valve 146 is in the closed position. The respective main fluid bypass valve 168 for that respective main vessel 106, 204, 206, 208, 210, 212 would be in an open position to allow main piston 110 within that particular main vessel 106, 204, 206, 208, 210, 212 to settle to lower electromagnet 116 to dock. Once those main pistons 110 dock with their respective lower electromagnet 116, fluid bypass valves 168 would be closed. This cycle pattern of two ascending simultaneously would continue around the array. This cycle pattern would allow for a constant fluid 102 flow through hydro turbine 136, as when two pistons 110 dock with their upper electromagnet 114, two other main pistons 110 would be ready and released from their lower electromagnet 116.

Another mode of operation would be to allow three main pistons 110 to ascend simultaneously, essentially tripling the fluid 102 flow through hydro turbine 136. So, while three main pistons 110 ascend within main vessels 106, main vessel two 204, and main vessel three 206, the other three main pistons 110 would be descending or having compressed gas 104 injected at their underside within main vessel four 208, main vessel five 210, and main vessel six 212. Respective main inlet valves 146 would be in an open position for the ascending main pistons 110, while all of the remaining main inlet valves 146 would be in the closed position. During the descent cycle for each main piston 110, the respective main inlet valve 146 is in the closed position. The respective main fluid bypass valve 168 for that respective main vessel 106, 204, 206, 208, 210, 212 would be in an open position to allow main piston 110 within that main vessel 106, 204, 206, 208, 210, 212 to settle to lower electromagnet 116 to dock. Once those main pistons 110 dock with their respective lower electromagnet 116, fluid bypass valves 168 would be closed. This cycle pattern of three ascending simultaneously would continue back and forth across the array.

Main human access hatch 180 disposed through main top cap 176 allows for human entry into the top section of main vessels 106, 204, 206, 208, 210, 212.

Main top cap 176 disposed at the top of main vessels 106, 204, 206, 208, 210, 212 is removable so as to allow complete access to the inside of the main vessels 106, 204, 206, 208, 210, 212 for insertion of main pistons 110 or for any other purposes requiring a large opening.

One of the benefits of using multiple main vessels 106, 204, 206, 208, 210, 212 in a singular setup is lower construction costs for a larger electrical output due to the sharing of a single other vessel 108 that supplies the gravity source and gravity force for each of the main vessels 106, 204, 206, 208, 210, 212.

Detailed Description of Embodiment "G"

Figure 14:
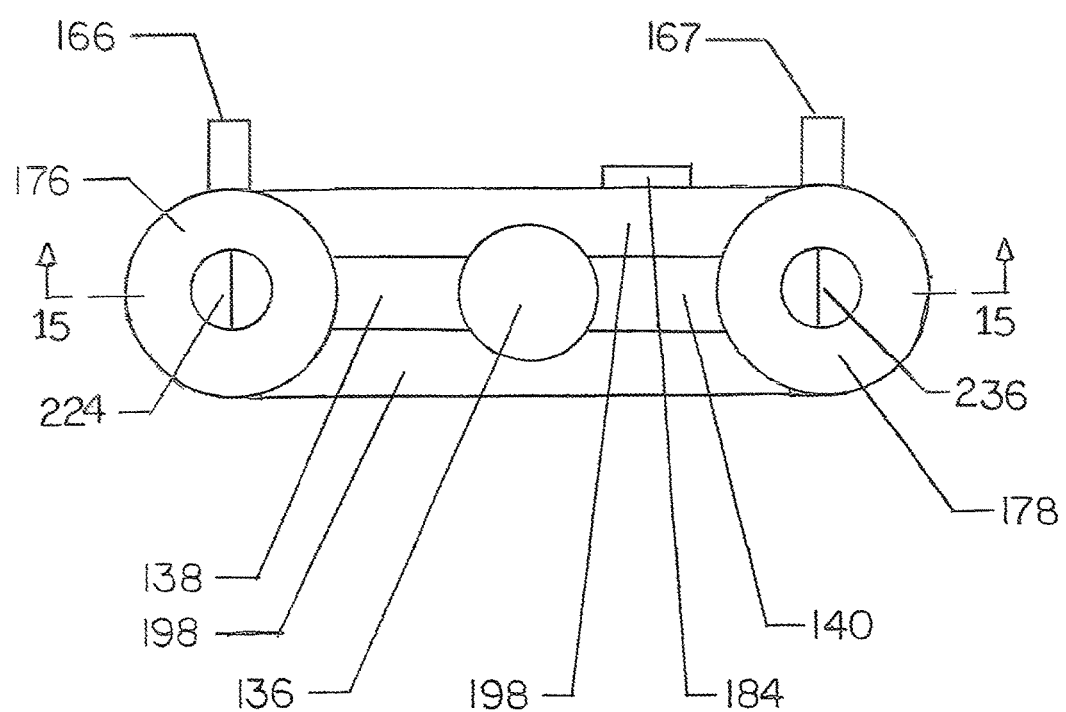
FIG. 14 is a plan view of embodiment "G"
Figure 15:
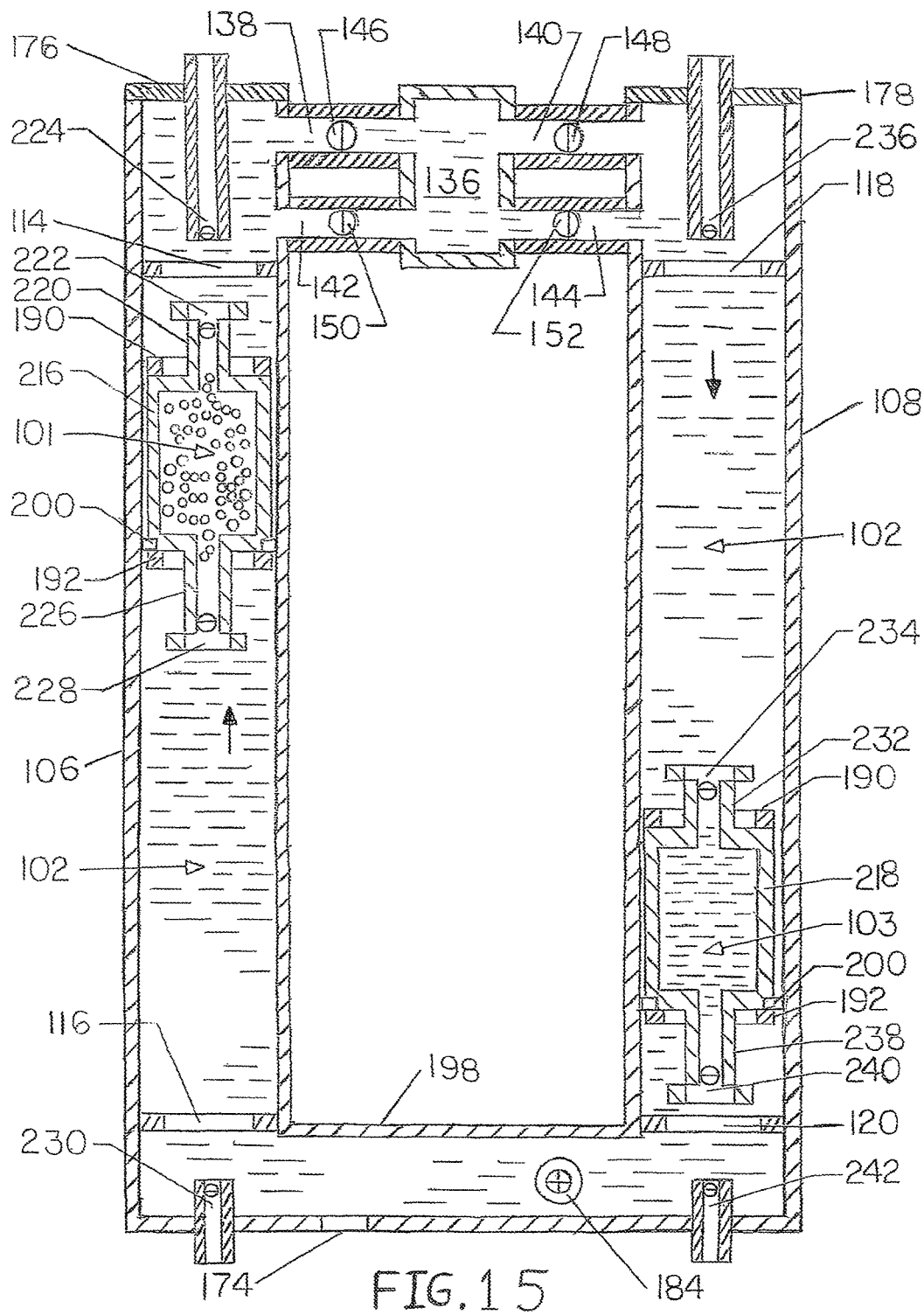
FIG. 15 is a front elevation cross-sectional view of embodiment "G" and is referenced by section lines 15-15 in FIG. 14. It depicts a main hollow piston in an ascent cycle and an other hollow piston in a descent cycle. The main hollow piston is full of air at atmospheric pressure and the other hollow piston is full of atmospheric fluid, or matter.
Figure 16:
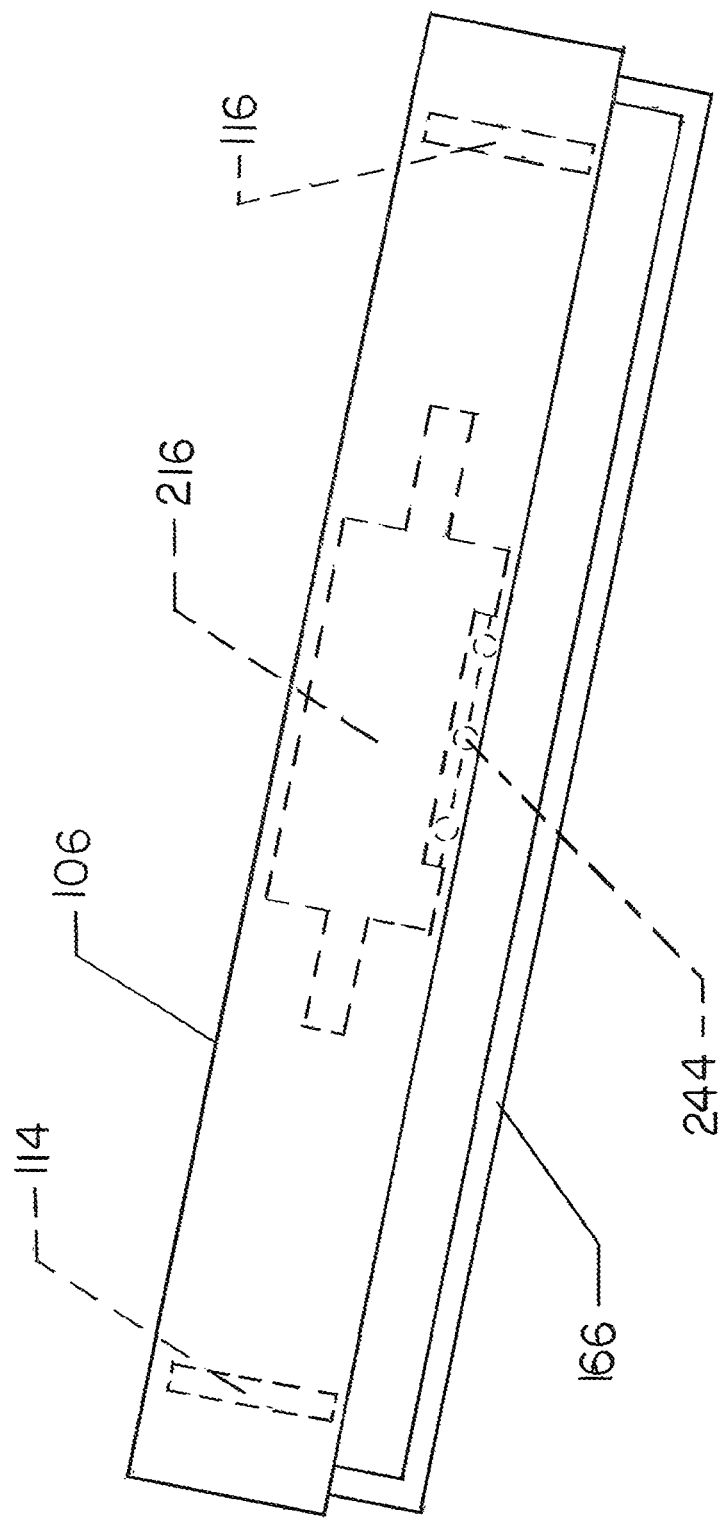
FIG. 16 is a left side elevation view of embodiment "G" erected at a low degree of angle, which also depicts the main hollow piston and an undercarriage with wheels.

Drawings FIG. 14, FIG. 15, and FIG. 16 can be referenced to for this embodiment.

This embodiment utilizes modified pistons.

This embodiment of O.U.B.H.E.L.P. can also be erected anywhere from vertical to near horizontal. This example will be of a low angle construction.

This hydroelectric power plant comprises a low angle erected elongated main vessel 106 and a low angle erected elongated other vessel 108. Main vessel 106 and other vessel 108 are connected at the bottom to fluid crossover section 198. Vessel 106 is connected near top to hydro turbine 136 by main inlet pipe 138 and main outlet pipe 142. Other vessel 108 is connected near top to hydro turbine 136 by other outlet pipe 144 and other inlet pipe 140. The system is filled with fluid 102 so as to create a fluid loop. This fluid loop allows for fluid 102 flow between vessel 106 and vessel 108 at both bottom and near top.

Main inlet valve 146 is disposed within main inlet pipe 138. Main outlet valve 150 is disposed within main outlet pipe 142. Other inlet valve 148 is disposed within other inlet pipe 140. Other outlet valve 152 is disposed within other outlet pipe 144.

A main hollow piston 216 is disposed slidably with minimal clearance within main vessel 106. Main hollow piston 216 is hollow. Piston 216 can be constructed in one piece or in segments so as to be assembled within vessel 106. Piston seal 200 is fitted to piston 216. Piston upper shock absorber 190 is fitted to the top of piston 216 and piston lower shock absorber 192 is fitted to the bottom of piston 216. Piston upper magnetic ring 194 is fitted to the top of upper shock absorber 190 and piston lower magnetic ring 196 is fitted to the bottom of lower shock absorber 192.

Piston 216 has a main hollow piston upper fill pipe 220 connected to its topside with a main hollow piston upper fill valve 222 connected at the upper end of upper fill pipe 220. There is also a main hollow piston lower empty pipe 226 connected at the underside of piston 216 with a main hollow piston lower empty valve 228 connected to the lower end of lower empty pipe 226.

There is a main vessel fill valve 224 disposed through the top of main vessel 106.

There is a main vessel empty valve 230 disposed through the bottom of main vessel 106.

An undercarriage with wheels 244 is disposed on the lower side of piston 216.

An other hollow piston 218 is disposed slidably with minimal clearance within other vessel 108. Other hollow piston 218 is hollow. Piston 218 can be constructed in one piece or in segments so as to be assembled within other vessel 108. Piston seal 200 is fitted to piston 218. Upper shock absorber 190 is fitted to the top of piston 218 and lower shock absorber 192 is fitted to the bottom of piston 218. Piston upper magnetic ring 194 is fitted to the top of upper shock absorber 190 and lower magnetic ring 196 is fitted to the bottom of lower shock absorber 192.

Piston 218 has an other hollow piston upper fill pipe 232 connected to its topside with an other hollow piston upper fill valve 234 connected at the upper end of upper fill pipe 232. There is also an other hollow piston lower empty pipe 238 connected at the underside of piston 218 with an other hollow piston lower empty valve 240 connected to the lower end of lower empty pipe 238.

There is an other vessel fill valve 236 disposed through the top of other vessel 108.

There is an other vessel empty valve 242 disposed through the bottom of other vessel 108.

Undercarriage with wheels 244 is disposed on the lower side of piston 218.

Main upper electromagnet 114 is disposed within main vessel 106 near the top and main lower electromagnet 116 is disposed within main vessel 106 near the bottom.

Other upper electromagnet 118 is disposed within other vessel 108 near the top and other lower electromagnet 120 is disposed within other vessel 108 near the bottom.

Main fluid bypass pipe 166 is located outside of main vessel 106. The upper end of bypass pipe 166 is connected to main upper fluid bypass orifice 170 that is disposed through the wall of main vessel 106 at a location just above upper electromagnet 114. The lower end of bypass pipe 166 is connected to main lower fluid bypass orifice 172 that is disposed through the wall of main vessel 106 at a location just below lower electromagnet 116. Main fluid bypass valve 168 is disposed within bypass pipe 166.

Other fluid bypass pipe 167 is located outside of other vessel 108. The upper end of bypass pipe 167 is connected to other upper fluid bypass orifice 171 that is disposed through the wall of other vessel 108 at a location just above upper electromagnet 118. The lower end of bypass pipe 167 is connected to other lower fluid bypass orifice 173 that is disposed through the wall of other vessel 108 at a location just below lower electromagnet 120. Other fluid bypass valve 169 is disposed within bypass pipe 167.

An atmospheric fluid 103, water, or matter is used to fill piston 216 and piston 218.

An atmospheric air 101 alternately occupies the volume of space within piston 216 and piston 218.

Main top cap 176 is disposed at the top of main vessel 106.

Other top cap 178 is disposed at the top of other vessel 108.

Lower human access hatch 184 is disposed through the side of fluid crossover section 198.

Drain valve 174 is disposed through the bottom of fluid crossover section 198.

Detailed Operation of Embodiment "G"

I labeled atmospheric fluid 103 as such to distinguish it from fluid 102 that is contained within the fluid loop system of O.U.B.H.E.L.P. Fluid 102 within the fluid loop can be of a different nature, such as containing lubricants as mentioned before. Atmospheric fluid 103 constitutes weighted matter of solid or fluid composition. The weighted matter of solid or fluid composition that can be used to fill piston 216 and piston 218 can be of varying nature, such as but not limited to crushed ore, ball bearings, slurry feeds, earth fill, or any other type of product or weighted matter of solid or fluid composition that needs to be transported down elevation for further processing or transporting. Fluids in the industry that are now being transported through pipes to lower elevations but are too viscous or too corrosive to put through a hydro turbine can be used to fill piston 216 and piston 218. In the interest of simplicity these different products, both mentioned and implied, that constitute weighted matter of solid or fluid composition will be referred to as atmospheric fluid 103.

Atmospheric fluid 103 can be provided to a holding tank (not shown) located near the top of O.U.B.H.E.L.P. by a pump system (not shown) from any source, and then used to gravity feed piston 216 and piston 218. Atmospheric fluid 103 referencing to weighted matter of solid or fluid composition can be water and can be readily supplied at the top elevation of O.U.B.H.E.L.P. from a natural source, such as but not limited to a creek, stream, river, or lake. This embodiment can be utilized at a dam or other manmade reservoir to transport water to a lower elevation.

Since this embodiment is erected at a low degree of angle, undercarriage with wheels 244 can be utilized at the lower side of piston 216 and piston 218 to help alleviate friction caused by the weight of piston 216 and piston 218 against the inside wall of vessel 106 and vessel 108 respectively.

Main top cap 176 disposed at the top of main vessel 106 is removable so as to allow complete access to the inside of main vessel 106 for insertion of main piston 110 or for any other purposes requiring a large opening.

Other top cap 178 disposed at the top of other vessel 108 is removable so as to allow complete access to the inside of other vessel 108 for insertion of other piston 112 or for any other purposes requiring a large opening.

Lower human access hatch 184 disposed through the side of fluid crossover section 198 allows for humans to enter the lower section of O.U.B.H.E.L.P.

Piston seal 200 allows for a good fluid 102 tight seal within vessels 106 and 108.

Drain valve 174 disposed through the bottom of fluid crossover section 198 allows for complete fluid 102 drain.

To start an ascent cycle, main hollow piston 216 is docked with main lower electromagnet 116. Electromagnet 116 secures piston 216 in place by direct contact with lower magnetic ring 196 through electromagnetism.

While piston 216 is docked with lower electromagnet 116, other hollow piston 218 is docked with other upper electromagnet 118. Other upper electromagnet 118 secures piston 218 in place by direct contact with piston upper magnetic ring 194 through electromagnetism.

At this time, main inlet valve 146 is open and main outlet valve 150 is closed, while other inlet valve 148 is closed and other outlet valve 152 is open.

While main hollow piston 216 is docked with main lower electromagnet 116, main hollow piston lower empty valve 228 is coupled to main vessel empty valve 230. Main vessel empty valve 230 is opened, which allows for atmospheric fluid 103 within main hollow piston 216 to empty into an atmospheric condition under its own gravitational weight through main hollow piston lower empty pipe 226. As atmospheric fluid 103 drains, atmospheric air 101 is naturally drawn up to take its place within main hollow piston 216. After atmospheric fluid 103 has drained from main hollow piston 216, main vessel empty valve 230 is closed.

While other hollow piston 218 is docked with upper electromagnet 118, other hollow piston upper fill valve 234 is coupled to other vessel fill valve 236. Other vessel fill valve 236 is opened, which allows for atmospheric fluid 103 to fill other hollow piston 218 in atmospheric conditions under its own gravitational weight through other hollow piston upper fill pipe 232. After atmospheric fluid 103 has filled other hollow piston 218, other vessel fill valve 236 is closed.

Main hollow piston 216 is released from main lower electromagnet 116 and begins to ascend; simultaneously other hollow piston 218 is released from other upper electromagnet 118 and begins to descend. The weight of atmospheric fluid 103 within other hollow piston 218 forces fluid 102 below other hollow piston 218 down through other vessel 108 and into the bottom of main vessel 106. Thereby forcing the empty buoyant main hollow piston 216 up through main vessel 106 forcing fluid 102 above main hollow piston 216 up through main vessel 106 and through main inlet pipe 138 and through hydro turbine 136. Fluid 102 then exits hydro turbine 136 through other outlet pipe 144 and into other vessel 108.

Main inlet valve 146 is slowly closed near the end of the ascent cycle of piston 216 to help ease the docking process. Piston upper shock absorber 190 also helps to ease the docking process. Piston 216 docks with upper electromagnet 114 and main hollow piston upper fill valve 222 couples with main vessel fill valve 224.

If other hollow piston 218 has not yet docked with lower electromagnet 120, then other fluid bypass valve 169 is opened to allow fluid 102 to circumnavigate piston 218 to facilitate the descent of piston 218 to dock with lower electromagnet 120. Piston lower shock absorber 192 helps to cushion the docking process. After docking, bypass valve 169 is closed.

After main hollow piston 216 docks with upper electromagnet 114 and other hollow piston 218 docks with other lower electromagnet 120, the system repeats the same procedure as already described, only vice versa. Main hollow piston 216 is filled with atmospheric fluid 103 and other hollow piston 218 is emptied of atmospheric fluid 103. Main inlet valve 146 is closed and main outlet valve 150 is opened, while other inlet valve 148 is opened and other outlet valve 152 is closed.

After a fill and empty cycle is completed the whole process repeats itself, thereby while main hollow piston 216 is ascending other hollow piston 218 is descending and vice versa.

Fill valves 222, 224, 234, 236, empty valves 228, 230, 240, 242, fill pipes 220, 232, and empty pipes 226, 238 will be sized as large as the best engineering practices at the time will allow, this will facilitate a speedy fill and empty cycle reducing the time between each descent and ascent cycle.

Since this embodiment does not require compressed gas to create a buoyant condition, it has different advantages over some of the other embodiments. If compressed gas is not readily available from a tapped naturally occurring geological structure or as a normal byproduct of an industrial process, then an air compressor could be utilized for some of the other embodiments, which would require energy input to create the buoyant condition. This embodiment does not have that energy input requirement. The energy input to open and close valves to allow atmospheric fluid 103 to flow into and out of piston 216 and piston 218 would be all that is required to create the buoyant condition within this embodiment. If this embodiment is erected in an area where there is no naturally occurring atmospheric fluid 103 supplied at the top portion of O.U.B.H.E.L.P., than an atmospheric fluid 103 or water pumping system (not shown) can be utilized to pump atmospheric fluid 103 or water from the lower extremities of O.U.B.H.E.L.P. to the top of O.U.B.H.E.L.P. to provide an atmospheric fluid 103 source. An exterior fluid pumping system is not shown because it is a common system.

Detailed Description of Embodiment "H"

Figure 17:
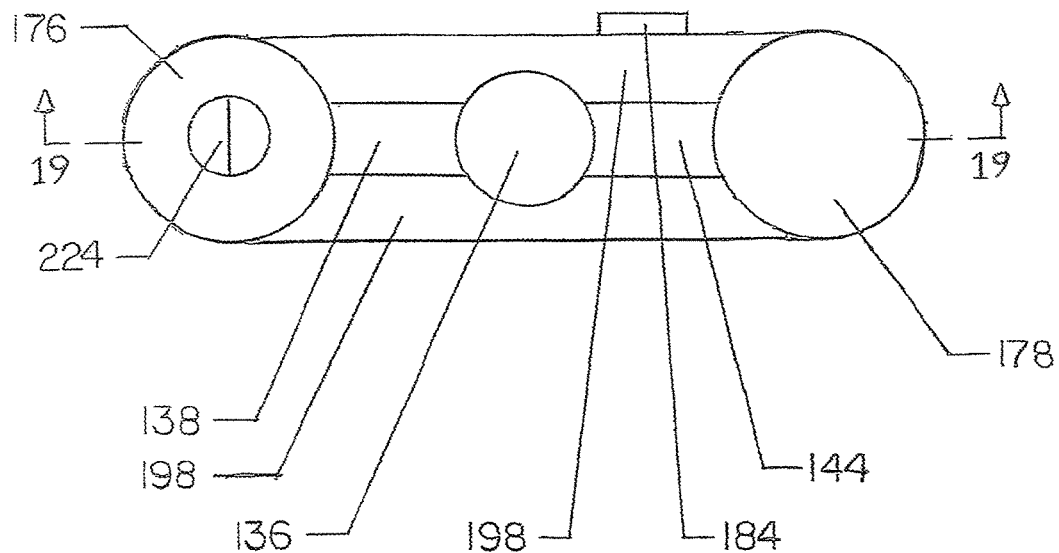
FIG. 17 is a plan view of embodiment "H"
Figure 19:
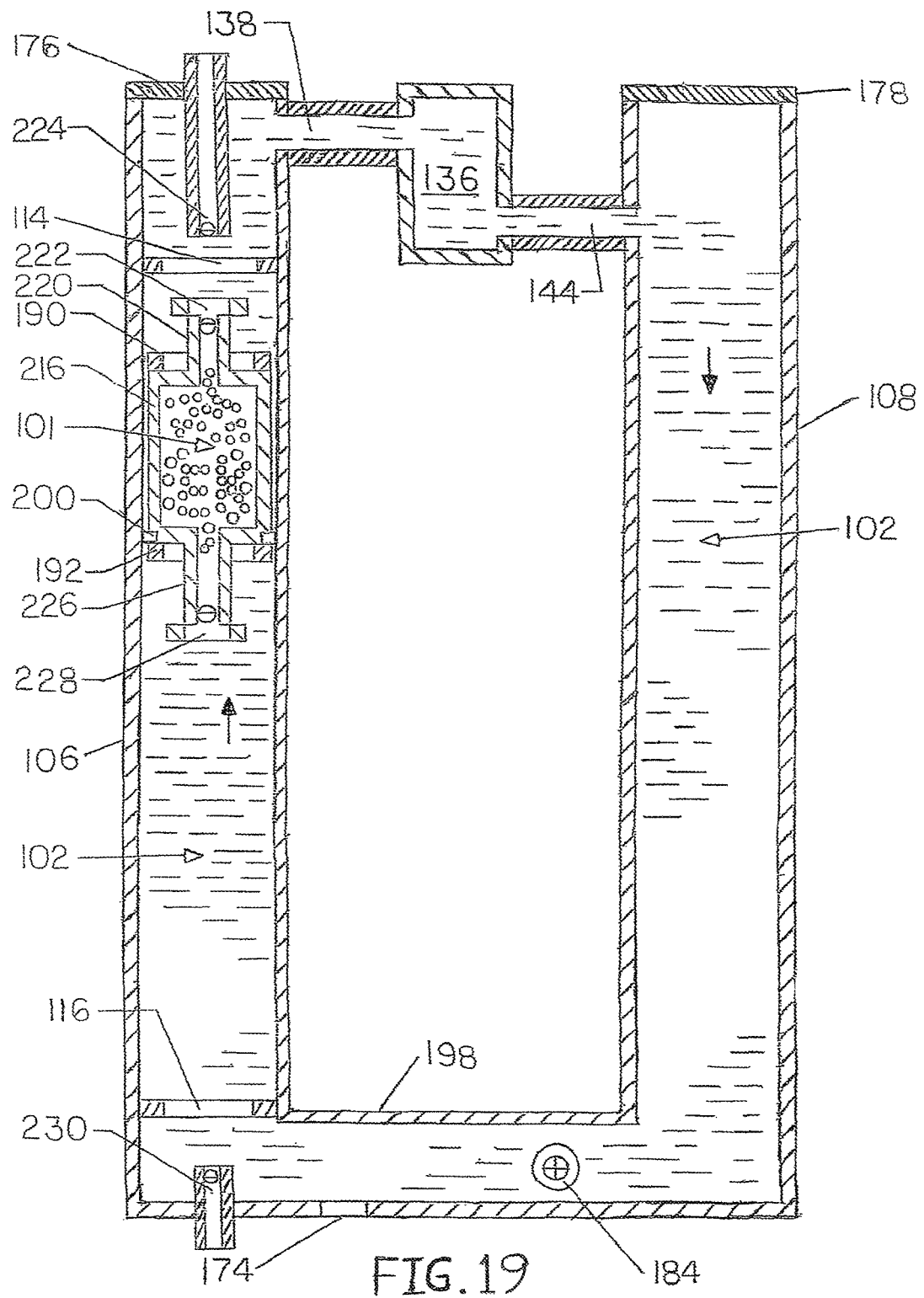
FIG. 19 is a front elevation cross-sectional view of embodiment "H" depicting a main hollow piston ascending, and is referenced by section lines 19-19 in FIG. 17.

Drawings FIG. 16, FIG. 17, and FIG. 19 can be referenced to for this embodiment.

This embodiment is much like embodiment "G". However, it uses a single hollow piston and consists of fewer features.

This embodiment of O.U.B.H.E.L.P. can also be erected anywhere from vertical to near horizontal. This example will be of a low angle construction.

This hydroelectric power plant comprises a low angle erected elongated main vessel 106 and a low angle erected elongated other vessel 108. Main vessel 106 and other vessel 108 are connected at the bottom to fluid crossover section 198. Vessel 106 is connected near top to hydro turbine 136 by main inlet pipe 138. Other vessel 108 is connected near top to hydro turbine 136 by other outlet pipe 144. The system is filled with fluid 102 so as to create a fluid loop. This fluid loop allows for fluid 102 flow between vessel 106 and vessel 108 at both bottom and near top.

Main hollow piston 216 is disposed slidably with minimal clearance within main vessel 106. Main hollow piston 216 is hollow. Piston 216 can be constructed in one piece or in segments so as to be assembled within vessel 106. Piston seal 200 is fitted to piston 216. Piston upper shock absorber 190 is fitted to the top of piston 216 and piston lower shock absorber 192 is fitted to the bottom of piston 216. Piston upper magnetic ring 194 is fitted to the top of upper shock absorber 190 and piston lower magnetic ring 196 is fitted to the bottom of lower shock absorber 192.

Piston 216 has main hollow piston upper fill pipe 220 connected to its topside with main hollow piston upper fill valve 222 connected at the upper end of upper fill pipe 220. There is also main hollow piston lower empty pipe 226 connected at the underside of piston 216 with main hollow piston lower empty valve 228 connected to the lower end of lower empty pipe 226.

Main vessel fill valve 224 is disposed through the top of main vessel 106.

Main vessel empty valve 230 is disposed through the bottom of main vessel 106.

Undercarriage with wheels 244 is disposed on the lower side of piston 216.

Main upper electromagnet 114 is disposed within main vessel 106 near the top and main lower electromagnet 116 is disposed within main vessel 106 near the bottom.

Atmospheric fluid 103, water, or matter is used to fill piston 216.

Atmospheric air 101 alternately occupies the volume of space within piston 216.

Main top cap 176 is disposed at the top of main vessel 106.

Other top cap 178 is disposed at the top of other vessel 108.

Lower human access hatch 184 is disposed through the side of fluid crossover section 198.

Drain valve 174 is disposed through the bottom of fluid crossover section 198.

Detailed Operation of Embodiment "H"

Atmospheric fluid 103 can be provided to a holding tank (not shown) located near the top of O.U.B.H.E.L.P. by a pump system (not shown) from any source, and then used to gravity feed piston 216. Atmospheric fluid 103 can be water and can be readily supplied at the top elevation of O.U.B.H.E.L.P. from a natural source, such as but not limited to a creek, stream, river, or lake.

Since this embodiment is erected at a low degree of angle, an undercarriage with wheels 244 can be utilized at the lower side of piston 216 to help alleviate friction caused by the weight of piston 216 against the inside wall of vessel 106.

Main top cap 176 disposed at the top of main vessel 106 is removable so as to allow complete access to the inside of main vessel 106 for insertion of main piston 110 or for any other purposes requiring a large opening.

Other top cap 178 disposed at the top of other vessel 108 is removable so as to allow complete access to the inside of other vessel 108 for any purposes requiring a large opening.

Lower human access hatch 184 disposed through the side of fluid crossover section 198 allows for humans to enter the lower section of O.U.B.H.E.L.P.

Piston seal 200 allows for a good fluid 102 tight seal within vessels 106.

Drain valve 174 disposed through the bottom of fluid crossover section 198 allows for complete fluid 102 drain.

To start an ascent cycle, main hollow piston 216 is docked with main lower electromagnet 116. Electromagnet 116 secures piston 216 in place by direct contact with lower magnetic ring 196 through electromagnetism.

While main hollow piston 216 is docked with main lower electromagnet 116, main hollow piston lower empty valve 228 is coupled to main vessel empty valve 230. Main vessel empty valve 230 is opened, which allows for atmospheric fluid 103 within main hollow piston 216 to empty into atmospheric conditions under its own gravitational weight through main hollow piston lower empty pipe 226. As atmospheric fluid 103 drains, atmospheric air 101 is naturally drawn up to take its place within main hollow piston 216. After atmospheric fluid 103 has drained from main hollow piston 216, main vessel empty valve 230 is closed.

Main hollow piston 216 is released from main lower electromagnet 116 and begins an ascent cycle.

The buoyancy within main hollow piston 216 forces fluid 102 above main hollow piston 216 up through main vessel 106 and through main inlet pipe 138 and through hydro turbine 136. Fluid 102 then exits hydro turbine 136 through other outlet pipe 144 and into other vessel 108.

Piston upper shock absorber 190 helps to ease the docking process. Piston 216 docks with upper electromagnet 114 and main hollow piston upper fill valve 222 couples with main vessel fill valve 224.

While piston 216 is docked with upper electromagnet 114, main vessel fill valve 224 is opened, which allows for atmospheric fluid 103 to fill piston 216 in an atmospheric condition under its own gravitational weight through main hollow piston upper fill pipe 220. After atmospheric fluid 103 has filled main hollow piston 216, main vessel fill valve 224 is closed.

Main hollow piston 216 is then released from upper electromagnet 114 and begins a descent cycle.

The added weight of atmospheric fluid 103 within main hollow piston 216 forces fluid 102 below main hollow piston 216 down through main vessel 106 and into the bottom of other vessel 108. Fluid 102 is then forced up through other vessel 108 and through other outlet pipe 144 and through hydro turbine 136. Fluid 102 then exits hydro turbine 136 through main inlet pipe 138 and into main vessel 106.

Main hollow piston 216 then docks with main lower electromagnet 116. This ends a complete ascent and descent cycle of this embodiment.

In this embodiment piston 216 is only partially filled with atmospheric fluid 103. This will allow for a negative buoyancy of a predetermined force. This in turn allows piston 216 to settle and urge the fluid back through the fluid loop without producing any great kinetic force through hydro turbine 136.

Detailed Description of Embodiment "I"

Figure 18:
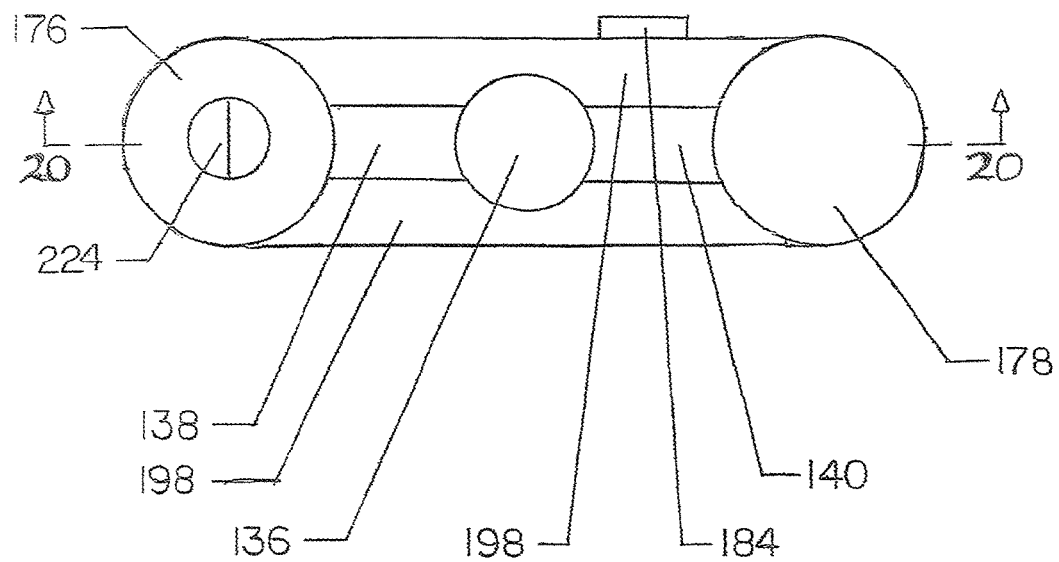
FIG. 18 is a plan view of embodiment "I"
Figure 20:
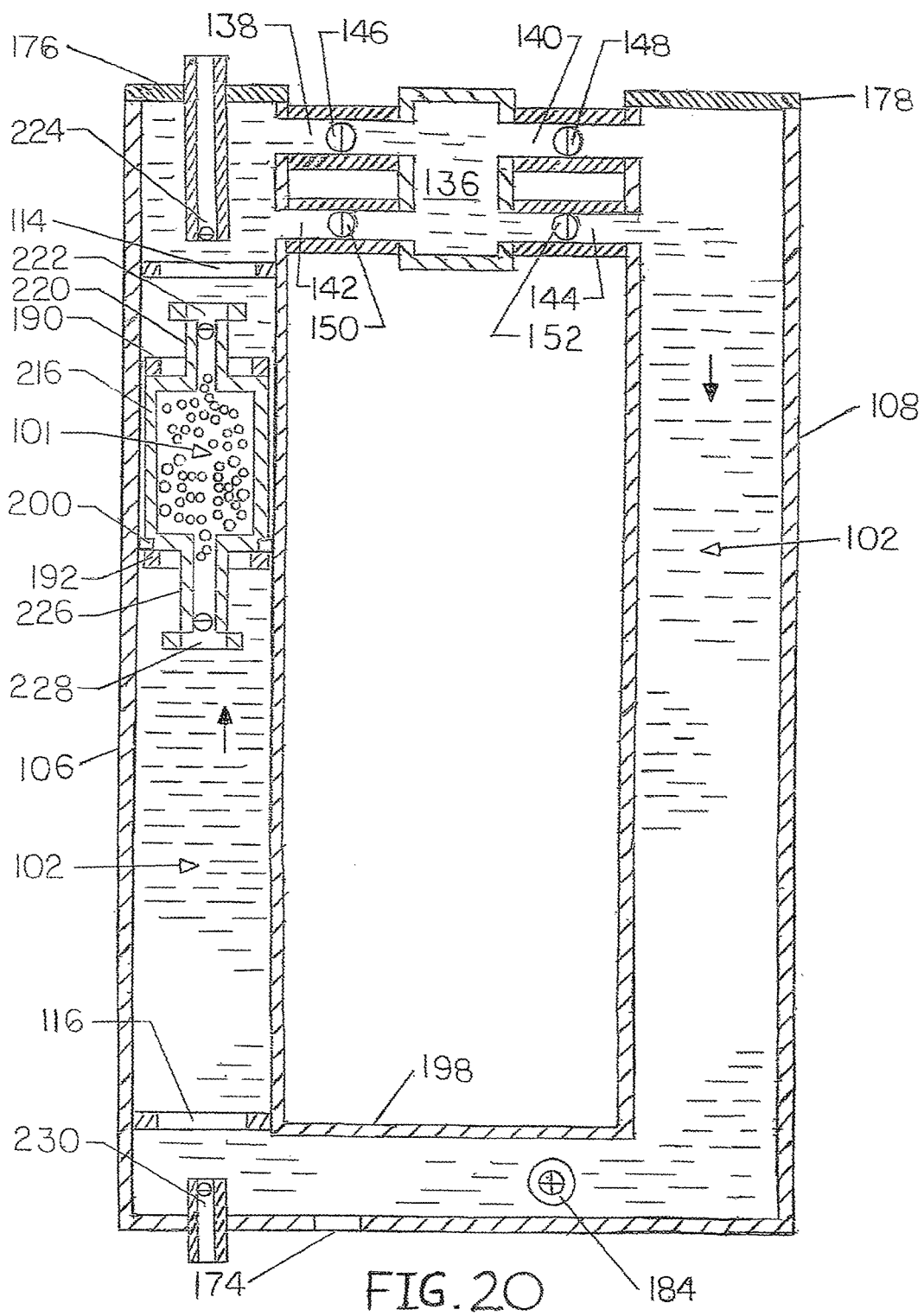
FIG. 20 is a front elevation cross-sectional view of embodiment "I" depicting a main hollow piston ascending, and is referenced by section lines 20-20 in FIG. 18.
Figure 21:
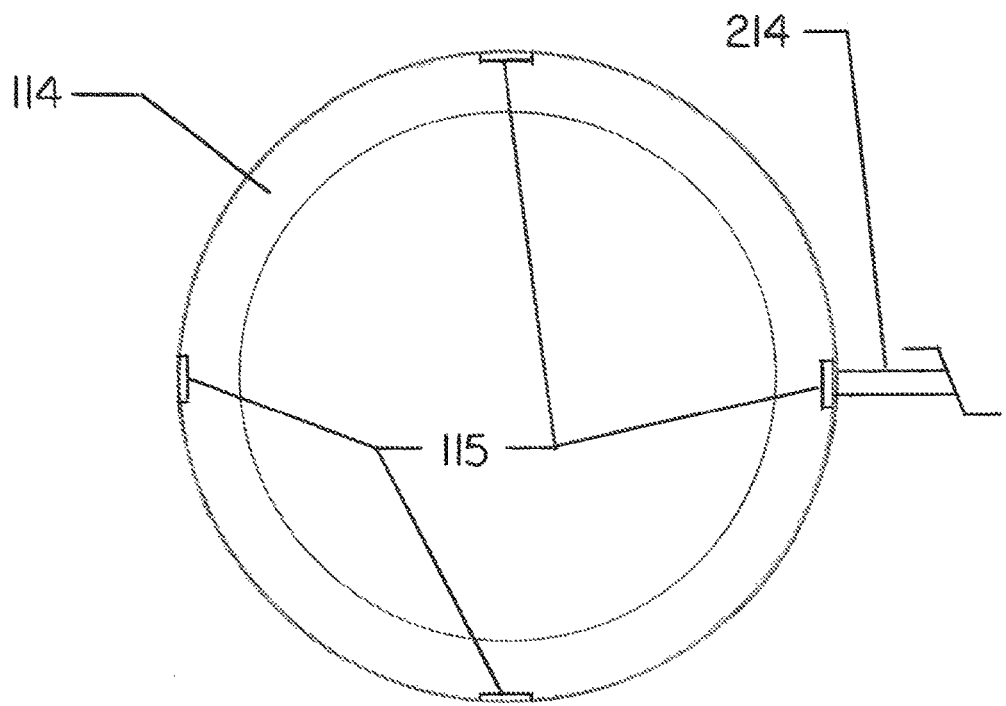
FIG. 21 is a plan view of a main upper electromagnet.
Figure 22:
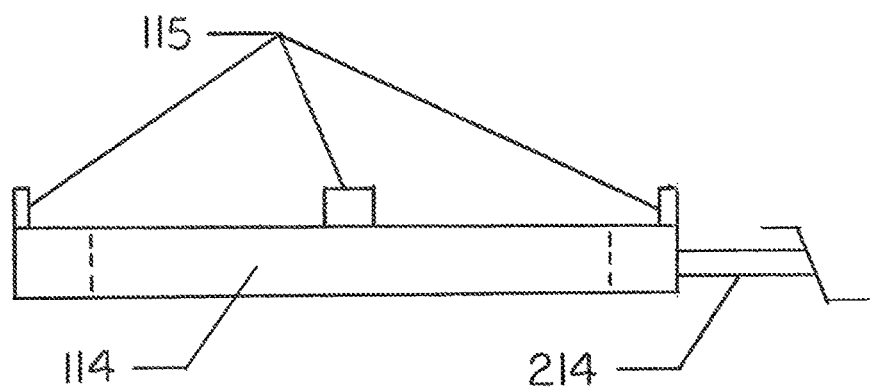
FIG. 22 is an elevation view of a main upper electromagnet.
Figure 23:
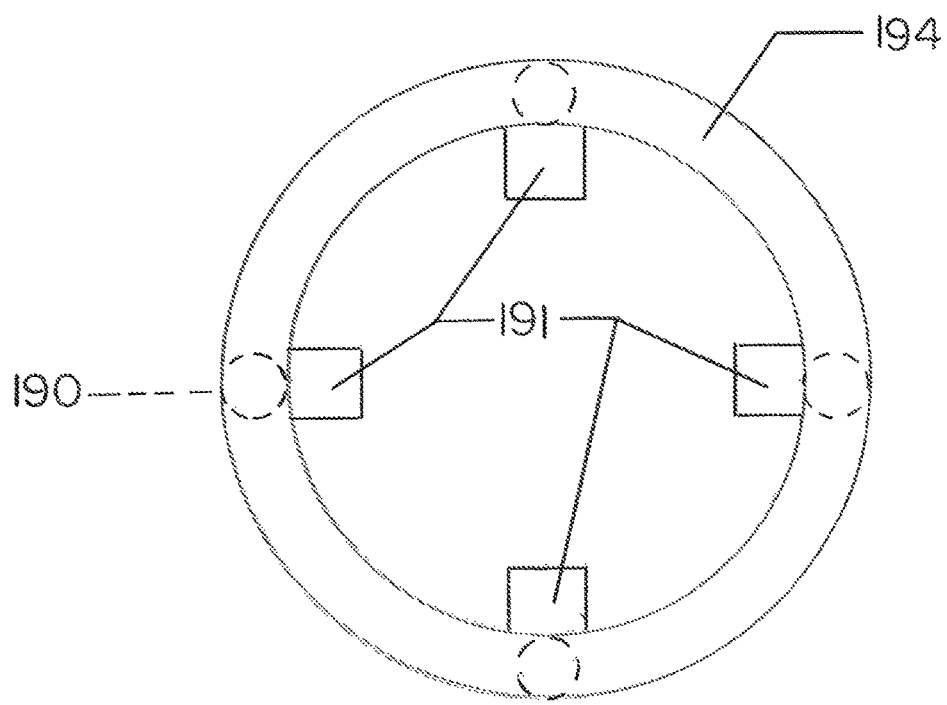
FIG. 23 is a plan view of a piston upper shock absorber.
Figure 24:
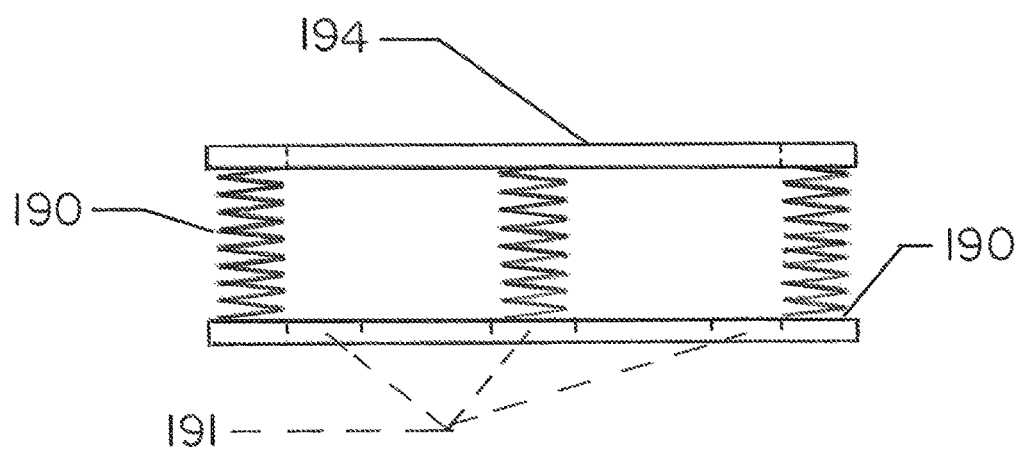
FIG. 24 is an elevation view of a piston upper shock absorber.

Drawings FIG. 16, FIG. 18, and FIG. 20 can be referenced to for this embodiment.

This embodiment is much like embodiment "H". However, it consists of a few more features.

This embodiment of O.U.B.H.E.L.P. can also be erected anywhere from vertical to near horizontal. This example will be of a low angle construction.

This hydroelectric power plant comprises a low angle erected elongated main vessel 106 and a low angle erected elongated other vessel 108. Main vessel 106 and other vessel 108 are connected at the bottom to a fluid crossover section 198. Vessel 106 is connected near top to hydro turbine 136 by main inlet pipe 138 and main outlet pipe 142. Other vessel 108 is connected near top to hydro turbine 136 by other outlet pipe 144 and other inlet pipe 140.

The system is filled with fluid 102 so as to create a fluid loop. This fluid loop allows for fluid 102 flow between vessel 106 and vessel 108 at both bottom and near top.

Main inlet valve 146 is disposed within main inlet pipe 138. Main outlet valve 150 is disposed within main outlet pipe 142. Other inlet valve 148 is disposed within other inlet pipe 140. Other outlet valve 152 is disposed within other outlet pipe 144.

Main hollow piston 216 is disposed slidably with minimal clearance within main vessel 106. Main hollow piston 216 is hollow. Piston 216 can be constructed in one piece or in segments so as to be assembled within vessel 106. Piston seal 200 is fitted to piston 216. Piston upper shock absorber 190 is fitted to the top of piston 216 and piston lower shock absorber 192 is fitted to the bottom of piston 216. Piston upper magnetic ring 194 is fitted to the top of upper shock absorber 190 and piston lower magnetic ring 196 is fitted to the bottom of lower shock absorber 192.

Piston 216 has main hollow piston upper fill pipe 220 connected to its topside with main hollow piston upper fill valve 222 connected at the upper end of upper fill pipe 220. There is also main hollow piston lower empty pipe 226 connected at the underside of piston 216 with main hollow piston lower empty valve 228 connected to the lower end of lower empty pipe 226.

Main vessel fill valve 224 is disposed through the top of main vessel 106.

Main vessel empty valve 230 is disposed through the bottom of main vessel 106.

Undercarriage with wheels 244 is disposed on the lower side of piston 216.

Main upper electromagnet 114 is disposed within main vessel 106 near the top and main lower electromagnet 116 is disposed within main vessel 106 near the bottom.

Atmospheric fluid 103, water, or matter is used to fill piston 216.

Atmospheric air 101 alternately occupies the volume of space within piston 216.

Main top cap 176 is disposed at the top of main vessel 106.

Other top cap 178 is disposed at the top of other vessel 108.

Lower human access hatch 184 is disposed through the side of fluid crossover section 198.

Drain valve 174 is disposed through the bottom of fluid crossover section 198.

Detailed Operation of Embodiment "I"

Atmospheric fluid 103 can be provided to a holding tank (not shown) located near the top of O.U.B.H.E.L.P. by a pump system (not shown) from any source, and then used to gravity feed piston 216. Atmospheric fluid 103 can be water and can be readily supplied at the top elevation of O.U.B.H.E.L.P. from a natural source, such as but not limited to a creek, stream, river, or lake.

Since this embodiment is erected at a low degree of angle, undercarriage with wheels 244 can be utilized at the lower side of piston 216 to help alleviate friction caused by the weight of piston 216 against the inside wall of vessel 106.

Main top cap 176 disposed at the top of main vessel 106 is removable so as to allow complete access to the inside of main vessel 106 for insertion of main piston 110 or for any other purposes requiring a large opening.

Other top cap 178 disposed at the top of other vessel 108 is removable so as to allow complete access to the inside of other vessel 108 for any purposes requiring a large opening.

Lower human access hatch 184 disposed through the side of fluid crossover section 198 allows for humans to enter the lower section of O.U.B.H.E.L.P.

Piston seal 200 allows for a good fluid 102 tight seal within vessels 106.

Drain valve 174 disposed through the bottom of fluid crossover section 198 allows for complete fluid 102 drain.

To start an ascent cycle, main hollow piston 216 is docked with main lower electromagnet 116. Electromagnet 116 secures piston 216 in place by direct contact with lower magnetic ring 196 through electromagnetism.

While main hollow piston 216 is docked with main lower electromagnet 116, main hollow piston lower empty valve 228 is coupled to main vessel empty valve 230. Main vessel empty valve 230 is opened, which allows for atmospheric fluid 103 within main hollow piston 216 to empty into atmospheric conditions under its own gravitational weight through main hollow piston lower empty pipe 226. As atmospheric fluid 103 drains, atmospheric air 101 is naturally drawn up to take its place within main hollow piston 216. After atmospheric fluid 103 has drained from main hollow piston 216, main vessel empty valve 230 is closed.

At this time, main inlet valve 146 is opened and main outlet valve 150 is closed, while other inlet valve 148 is closed and other outlet valve 152 is opened.

Main hollow piston 216 is released from main lower electromagnet 116 and begins an ascent cycle.

The buoyancy within main hollow piston 216 forces fluid 102 above main hollow piston 216 up through main vessel 106 and through main inlet pipe 138 and through main inlet valve 146 and through hydro turbine 136. Fluid 102 then exits hydro turbine 136 through other outlet pipe 144 and through other outlet valve 152 into other vessel 108.

Main inlet valve 146 is slowly closed near the end of the ascent cycle of piston 216 to help ease the docking process. Piston upper shock absorber 190 helps to ease the docking process. Piston 216 docks with upper electromagnet 114 and main hollow piston upper fill valve 222 couples with main vessel fill valve 224.

While piston 216 is docked with upper electromagnet 114, main vessel fill valve 224 is opened, which allows for atmospheric fluid 103 to fill piston 216 at atmospheric conditions under its own gravitational weight through main hollow piston upper fill pipe 220. After atmospheric fluid 103 has filled main hollow piston 216, main vessel fill valve 224 is closed.

At this time, main inlet valve 146 is closed and main outlet valve 150 is opened, while other inlet valve 148 is opened and other outlet valve 152 is closed.

Main hollow piston 216 is then released from upper electromagnet 114 and begins a descent cycle.

The added weight of atmospheric fluid 103 within main hollow piston 216 forces fluid 102 below main hollow piston 216 down through main vessel 106 and into the bottom of other vessel 108. Fluid 102 is then forced up through other vessel 108 and through other inlet pipe 140 and through other inlet valve 148 and through hydro turbine 136. Fluid 102 then exits hydro turbine 136 through main outlet pipe 142 and through main outlet valve 150 and into main vessel 106.

Other inlet valve 148 is slowly closed near the end of the descent cycle of piston 216 to help ease the docking process.

Main hollow piston 216 then docks with main lower electromagnet 116. This ends a complete ascent and descent cycle of this embodiment.

In this embodiment piston 216 is completely filled with atmospheric fluid 103. This will allow for a heavy negative buoyancy of a predetermined force, determined by the weight of main hollow piston 216. This allows piston 216 to descend with great force. This in turn allows O.U.B.H.E.L.P. to produce a great kinetic force through hydro turbine 136 during the descent cycle as well as the ascent cycle.

Advantages

O.U.B.H.E.L.P. has several advantages attributed to one or more aspects, such as but not limited to a self-contained fluid loop which allows the buoyancy force to function within the system and which also allows the gravity source to be self-resupplying.

Also, in some embodiments, the compressed gas pocket is unhindered and allowed to expand during an ascent cycle, which in turn allows the kinetic energy of the fluid to increase above the expanding compressed gas pocket until the end of the ascent cycle, thusly allowing for greater electrical output.

Also, in some embodiments, compressed gas is not used to create a buoyant condition. Instead, a hollow piston is gravity filled and gravity emptied of atmospheric fluid, thusly avoiding any energy consumption which would be required in providing a compressed gas supply.

Also, in some embodiments, the hollow pistons can be filled with other matter besides atmospheric fluid, such as but not limited to corrosive or viscous fluids that can't be put through a hydro turbine. And also, solid matter, such as but not limited to earth products, minerals and ores from a mining operation, elements or powdered chemical compositions that need to be transported down elevation to another facility for next process procedures, etc.

Also, in some embodiments, erecting O.U.B.H.E.L.P. at a low degree of angle following the slope of the land allows for much greater length of vessels to be utilized, thusly providing a greater volume of fluid through the hydro turbine per each ascent and descent cycle. Following the slope of the land also allows for the major portion of the vessels length to be constructed below the surface of the land and covered with soil, thusly allowing the surface above the vessels to be utilized for other purposes. Burying the vessels also allows for a large capacity power plant with a very small surface footprint.

O.U.B.H.E.L.P. is a very ecologically minded machine.

CONCLUSIONS, RAMIFICATIONS, AND SCOPE

While my detailed descriptions contain many specificities, these should not be construed as limitations on the scope, but rather as an exemplification of several embodiments thereof. Many other variations are possible and some are given as follows.

Because of variations between embodiments, ramifications may apply to one or more different embodiments.

The atmospheric air vents can be ducted to air turbines that would harness the air flow that is displaced by the fluid which is displaced by the ever expanding compressed gas pocket within the system.

Although one hydro turbine is referenced to within the embodiments, two or more can be utilized within the system for better efficiency or to accommodate larger fluid flows. The location of the hydro turbine is referenced as being near the top of the embodiments, however, the hydro turbines can be placed within the fluid flow at the bottom of the vessels if the turbines are of the correct fluid flow design. In addition, hydro turbines can be utilized at both top and bottom of the fluid flow loop simultaneously. Other means of harnessing the kinetic energy of the fluid flow besides hydro turbines is possible within these embodiments, and, however these other means harness that kinetic energy they fall within the scope of these embodiments.

Bidirectional hydro turbines can be utilized within this system. A bidirectional hydro turbine would only require a single source pipe between each vessel and the bidirectional hydro turbine. This single source pipe would be in lieu of separate inlet and outlet pipes connected to each vessel from the hydro turbine.

Evacuation of the compressed gas from the underside of the piston has been depicted as an evacuation orifice through the wall of the vessels, however, other means of evacuating the compressed gas pocket can be utilized, such as but not limited to a valve placed through the piston which would release the gas into the vessel above the piston, the area above the piston being of atmospheric or near atmospheric air pressure.

The main vessels and the other vessels can be of similar or dissimilar size and shape.

The main piston and the other piston can be of similar or dissimilar size and shape. The piston topside and underside can be of a shape other than flat, such as but not limited to a concave or convex shape.

The reservoir can be of an open top or enclosed construction. One reservoir has been mentioned, however, separate reservoirs for each vessel can be utilized.

A compressed gas inlet orifice through the wall of the vessels has been given as an example of how the compressed gas can be injected at the underside of the piston, however, other means of injecting the compressed gas can be utilized, such as but not limited to a tank disposed within and at the bottom of the vessels can be connected to a gas supply line and filled with compressed gas. The tank would be in the process of being filled with compressed gas while the piston is ascending and descending so that when the piston docks with the lower electromagnet the required volume of compressed gas is ready to be released through at least one large valve which would provide the compressed gas pocket at the underside of the piston within seconds.

The hollow piston design depicted in embodiment "G" has been illustrated using two hollow pistons with the vessels erected at a low degree of angle, however, other arrangements can be utilized, such as but not limited to the examples illustrated in embodiments "A", "B", "C", "E", and "F".

Bypass pipes to allow fluid to circumnavigate the pistons have been mentioned in some embodiments. However, a fluid flow valve disposed through the pistons can be utilized in lieu of the mentioned bypass pipes. In the embodiments that utilize the hollow pistons, the fluid flow valves are already in place, and can be controlled to allow fluid to flow through the hollow pistons when required.

A single piston seal to help seal between the piston and the vessel wall has been depicted. In one embodiment it will help to contain the compressed gas pocket at the underside of the piston. In another embodiment it will help to contain the fluid above the piston, so that the fluid is forced upward in lieu of skirting around and below the piston. Only one piston seal per piston has been illustrated, however, more than one per piston can be utilized as required. Very large hydraulic piston rings are in use today for varying types of industrial purposes and are readily available in many different materials. These rings can also be sectional pieces fit around the piston in lieu of a single piece ring.

The piston shock absorbers have been depicted using coil springs, however, other types of shock absorbers can be utilized, such as but not limited to leaf springs or hydraulic absorbers which are common place in industry.

A turbo expander can be connected to the compressed gas evacuation valve, which would allow for a good amount of energy recovery, since the compressed gas would still be under hydrostatic pressure at the end of its ascent cycle. The turbo expander has not been described or shown as it is a common system.

While all mentioned embodiments have been shown in only some of their forms, it should be apparent to those skilled in the art that they are not so limited, but are susceptible to various changes and modifications without departing from the scope of the embodiments. Accordingly, it is appropriate that the appended claims be interpreted broadly and in a manner consistent with the scope of the embodiments. Also accordingly, the scope should be determined not only by the embodiments illustrated, but by the appended claims and their legal equivalents.

What is claimed is:

1. A machine that forces a fluid through at least one flow energy converter at an increasing pressure during an ascent cycle within an enclosed fluid loop system, comprising:
   a. a fluid;
   b. a compressed gas being of less density than said fluid and of a predetermined pressure;
   c. at least one elongated main vessel of a predetermined transverse cross sectional shape;
   d. at least one elongated other vessel of a predetermined transverse cross sectional shape, the main vessel and the other vessel to be connected at bottom to each other so as to allow fluid flow to and from the main vessel and the other vessel;
   e. at least one flow energy converter located near top of the main vessel and the other vessel, flow energy converter is connected to the main vessel and the other vessel so as to allow fluid flow to and from the main vessel and the other vessel;
   f. a main lower securing means disposed within and near bottom of the main vessel;
   g. a main upper securing means disposed within and near top of the main vessel;
   h. a main piston of predetermined weight, size, and shape disposed with minimal clearance within the main vessel so as to allow linear motion within the main vessel, said main piston also being disposed between said main lower securing means and said main upper securing means, said main piston also having an underside and a topside;
   i. the main vessel and the other vessel to be filled with said fluid, said fluid being in communication within and between the main vessel and the other vessel at both near top and bottom, thereby creating an internal fluid loop within and between the main vessel and the other vessel;
   j. a main compressed gas injection orifice disposed through a wall of the main vessel at a predetermined location below said main lower securing means, thereby allowing injection of said compressed gas below said underside of said main piston while said main piston is docked with said main lower securing means, creating what constitutes a compressed gas pocket at said underside of said main piston, thereby also being unhindered from below said compressed gas pocket is allowed to expand downwardly;

k. a main compressed gas evacuation orifice disposed through the wall of the main vessel at a predetermined location just below said main piston while it is docked with said main upper securing means, thereby allowing said compressed gas pocket at said underside of said main piston to be evacuated while said main piston is docked with said main upper securing means upon completing an ascent cycle;

whereby said compressed gas pocket at said underside of said main piston is unhindered from below and is allowed to expand as said main piston ascends which constitutes an expanding compressed gas pocket, thereby creating an increasing buoyancy force which forces said fluid above said main piston through said flow energy converter at an increasing pressure during said ascent cycle, whereby also, said internal fluid loop constitutes a gravity source and gravity force from within said machine.

2. The machine of claim 1 further comprising:
a. a main outlet pipe valve located near top of the main vessel, disposed between the main vessel and said flow energy converter so as to allow controlled fluid flow between the main vessel and said flow energy converter;
b. a main inlet pipe valve located near top of the main vessel, disposed between the main vessel and said flow energy converter so as to allow controlled fluid flow between the main vessel and said flow energy converter;
c. an other inlet pipe valve located near top of the other vessel, disposed between the other vessel and said flow energy converter so as to allow controlled fluid flow between the other vessel and said flow energy converter;
d. an other outlet pipe valve located near top of the other vessel, disposed between the other vessel and said flow energy converter so as to allow controlled fluid flow between the other vessel and said flow energy converter;
e. wherein said main piston is of a predetermined weight so as to act forcibly on said main fluid column below said main piston upon release from said main upper securing means;
whereby through the use of the inlet and outlet valves fluid flow is guided so as to allow said fluid to act forcibly through the flow energy converter during a descent cycle as well as said ascent cycle.

3. The machine of claim 1 further comprising:
a. a reservoir of predetermined size located and connected near top of the other vessel so as to allow fluid flow from and to the other vessel, said reservoir being disposed outside of the other vessel;
whereby allowing for temporary storage of said fluid displaced within said internal fluid loop by said expanding compressed gas pocket.

4. The machine of claim 1 further comprising:
a. a main outlet pipe valve located near top of the main vessel, disposed between the main vessel and said flow energy converter so as to allow controlled fluid flow between the main vessel and said flow energy converter;
b. a main inlet pipe valve located near top of the main vessel, disposed between the main vessel and said flow energy converter so as to allow controlled fluid flow between the main vessel and said flow energy converter;
c. an other inlet pipe valve located near top of the other vessel, disposed between the other vessel and said flow energy converter so as to allow controlled fluid flow between the other vessel and said flow energy converter;
d. an other outlet pipe valve located near top of the other vessel, disposed between the other vessel and said flow energy converter so as to allow controlled fluid flow between the other vessel and said flow energy converter;
e. an other lower securing means disposed within and near bottom of the other vessel;
f. an other upper securing means disposed within and near top of the other vessel;
g. an other piston of predetermined weight, size, and shape disposed with minimal clearance within the other vessel so as to allow linear motion within the other vessel, said other piston also being disposed between said other lower securing means and said other upper securing means, said other piston also having an underside and a topside;
h. an other compressed gas injection orifice disposed through a wall of the other vessel at a predetermined location below said other lower securing means, thereby allowing injection of said compressed gas below said underside of said other piston while said other piston is docked with said other lower securing means, creating what constitutes a compressed gas pocket at said underside of said other piston, thereby also being unhindered from below said compressed gas pocket is allowed to expand downwardly;
i. an other compressed gas evacuation orifice disposed through the wall of the other vessel at a predetermined location just below said other piston while it is docked with said other upper securing means, thereby allowing said compressed gas pocket at said underside of said other piston to be evacuated while said other piston is docked with said other upper securing means;
whereby while said main piston is in said ascent cycle said other piston is in a descent cycle and vice versa, whereby also said compressed gas pocket at said underside of said main piston and said underside of said other piston is unhindered from below and expands as said main piston and said other piston go through said ascent cycle which constitutes an expanding compressed gas pocket, thereby creating an increasing buoyancy force which forces said fluid above said main piston and said other piston through said flow energy converter at an increasing pressure during said ascent cycle, whereby also, said internal fluid loop constitutes a gravity source and gravity force from within said machine.

5. The machine of claim 4 further comprising:
a. a reservoir of predetermined size located and connected near top of the main vessel and the other vessel, said reservoir being disposed outside of the main vessel and the other vessel;
b. a main reservoir valve disposed between said reservoir and the main vessel connecting said reservoir and the main vessel together so as to allow fluid flow to and from said reservoir and the main vessel;

c. an other reservoir valve disposed between said reservoir and the other vessel connecting said reservoir and the other vessel together so as to allow fluid flow to and from said reservoir and the other vessel;

whereby allowing for temporary storage of said fluid displaced within said internal fluid loop by said expanding compressed gas pocket.

6. The machine of claim 4 further comprising:
a. a main bypass flow pipe, said main bypass flow pipe being disposed outside of and connected to the main vessel, said main bypass flow pipe having a proximal end and a distal end, said main bypass flow pipe proximal end being connected at a predetermined location below said main lower securing means and said main bypass flow pipe distal end being connected at a predetermined location above said main upper securing means;
b. an other bypass flow pipe, said other bypass flow pipe being disposed outside of and connected to the other vessel, said other bypass flow pipe having a proximal end and a distal end, said other bypass flow pipe proximal end being connected at a predetermined location below said other lower securing means and said other bypass flow pipe distal end being connected at a predetermined location above said other upper securing means;
c. a main bypass flow valve disposed within said main bypass flow pipe;
d. an other bypass flow valve disposed within said other bypass flow pipe;

whereby fluid is allowed to bypass said main piston and said other piston during a start-up sequence, and to facilitate said descent cycle of said main piston and said other piston if required.

7. The machine of claim 4 further comprising:
a. a main atmospheric air valve disposed at top of the main vessel;
b. an other atmospheric air valve disposed at top of the other vessel;
further wherein:
c. the machine is an air-tight system;

whereby said main atmospheric air valve or said other atmospheric air valve can be opened to allow said compressed gas pocket to expand during said ascent cycle or can be closed to create said air-tight system which would suppress the expansion of said compressed gas pocket.

8. The machine of claim 4 wherein:
a. the main vessel and the other vessel are erected at an angle anywhere from and between zero degrees horizontal and ninety degrees above horizontal;

whereby the machine can utilize a natural slope of the land and still function.

9. The machine of claim 4 wherein:
a. the main vessel and the other vessel are constructed vertically in the shape of a coil;

whereby the machine would contain a greater volume of fluid per each unit of vertical height than if constructed just straight up vertically.

10. The machine of claim 1 further comprising:
a. a plurality of main vessels arranged near the other vessel;
b. each of the main vessels to be connected at bottom to the other vessel so as to allow fluid flow between;
c. each of the main vessels having a main inlet pipe, each of said main inlet pipes having a proximal end and a distal end, said main inlet pipe proximal end being connected to near top of each of the main vessels and said main inlet pipe distal end being connected to said flow energy converter;
d. a plurality of main inlet pipe valves, one disposed within each said main inlet pipe;
e. a plurality of main lower securing means, one disposed within and near bottom of each of the main vessels;
f. a plurality of main upper securing means, one disposed within and near top of each of the main vessels;
g. a plurality of main pistons of predetermined weight, size, and shape, one disposed with minimal clearance within each of the main vessels;
h. a plurality of main compressed gas injection orifices, one disposed through the wall of each of the main vessels at a predetermined location below said main lower securing means;
i. a plurality of main compressed gas evacuation orifices, one disposed through the wall of each of the main vessels at a predetermined location just below said main piston while it is docked with said main upper securing means;
j. a plurality of main bypass flow pipes, one said main bypass flow pipe being disposed outside of and connected to each of the main vessels, each said main bypass flow pipe having a proximal end and a distal end, one said main bypass flow pipe proximal end being connected at a predetermined location below said main lower securing means and one said main bypass flow pipe distal end being connected at a predetermined location above said main upper securing means;
k. a plurality of main bypass flow valves, one disposed within each said main bypass flow pipe;
l. a reservoir of predetermined size located and connected near top of the other vessel so as to allow fluid flow from and to the other vessel, said reservoir being disposed outside of the other vessel;

whereby multiple ascent cycles simultaneously force greater volumes of said fluid through said flow energy converter, whereby also the other vessel containing said fluid is being utilized as a singular gravity source.

11. A method of forcing a fluid through at least one flow energy converter with an increasing buoyancy force during a main ascent cycle within an enclosed fluid loop system, comprising:
a. providing a fluid;
b. providing a compressed gas being of less density than said fluid and of a predetermined pressure;
c. providing at least one elongated main vessel of a predetermined transverse cross sectional shape;
d. providing at least one elongated other vessel of a predetermined transverse cross sectional shape, the main vessel and the other vessel to be connected at bottom so as to allow fluid flow to and from the main vessel and the other vessel;
e. providing a main separation means of predetermined weight, size, and shape disposed with minimal clearance within the main vessel so as to allow linear motion within the main vessel, said main separation means also having an underside and a topside;
f. providing the flow energy converter disposed and connected near top of the main vessel and the other vessel, so as to allow said fluid to flow through said flow energy converter to and from the main vessel and the other vessel;
g. providing a main upper securing means disposed within the main vessel near top;

h. providing a main lower securing means disposed within the main vessel near bottom;
i. filling the main vessel and the other vessel with said fluid; thereby,
j. creating an internal fluid loop between the main vessel and the other vessel;
k. initiating the main ascent cycle;
l. injecting said compressed gas with a main compressed gas injection means below said underside of said main separation means being held near bottom of the main vessel by said main lower securing means; thereby,
m. creating a compressed gas pocket at said underside of said main separation means; thereby,
n. creating a buoyancy force at said underside of said main separation means;
o. releasing said main separation means from said main lower securing means; thereby,
p. allowing said main separation means to ascend;
q. ascending compressed gas pocket at said underside of said main separation means expands during said ascent cycle; thereby,
r. displacing an increasing volume of fluid within said internal fluid loop; thereby,
s. creating an increasing buoyancy force at said underside of said main separation means; thereby,
t. forcing said fluid above said main separation means upward and through said flow energy converter at an increasing pressure; said fluid,
u. continuing through said flow energy converter into the other vessel; thereby,
v. refilling the other vessel as said fluid is flowing from the bottom thereof to the bottom of the main vessel; thereby also,
w. resupplying said fluid within the other vessel which provides the gravitational force which allows the buoyancy force to work within the main vessel;
x. docking said main separation means with said main upper securing means;
y. evacuating said compressed gas pocket from said underside of said main separation means with a main compressed gas evacuation means;
z. initiating a main descent cycle;
aa. releasing said main separation means from said main upper securing means;
bb. allowing said main separation means to descend;
cc. docking said main separation means with said main lower securing means;
dd. repeating (k) through (cc) repeatedly;
wherein energy will be produced by the flow energy converter during each said main ascent cycle.

12. The method of claim 11 further comprising:
a. providing a main outlet pipe valve disposed between the main vessel and the flow energy converter;
b. providing a main inlet pipe valve disposed between the main vessel and the flow energy converter;
c. providing an other inlet pipe valve disposed between the other vessel and the flow energy converter;
d. providing an other outlet pipe valve disposed between the other vessel and the flow energy converter;
e. providing said main separation means with a predetermined weight so as to be of a negative buoyancy force so as to act forcibly on said fluid below said main separation means upon release from said main upper securing means;
f. initiating said main descent cycle;
g. closing said main inlet pipe valve;
h. opening said main outlet pipe valve;
i. closing said other outlet pipe valve;
j. opening said other inlet pipe valve;
k. releasing said main separation means from said main upper securing means; thereby,
l. forcing said fluid below said main separation means down through the main vessel; thereby,
m. forcing said fluid upward within the other vessel and through said other inlet pipe valve and through said flow energy converter at a steady pressure near equal to said negative buoyancy force of said main separation means; said fluid,
n. continuing through said main outlet pipe valve and into the main vessel; thereby,
o. refilling the main vessel as said fluid is flowing from the bottom thereof to the bottom of the other vessel; thereby also,
p. resupplying said fluid within the main vessel which provides additional gravitational force which allows said negative buoyancy force to work within the main vessel;
q. docking said main separation means with main lower securing means;
r. opening said main inlet pipe valve;
s. closing said main outlet pipe valve;
t. opening said other outlet pipe valve;
u. closing said other inlet pipe valve;
v. ending said main descent cycle;
wherein said main separation means being of a predetermined negative buoyancy allows energy to be produced during said descent cycle also.

13. The method of claim 11 further comprising:
a. providing an other upper securing means disposed within the other vessel near top;
b. providing an other lower securing means disposed within the other vessel near bottom;
c. providing an other separation means of predetermined weight, size, and shape disposed with minimal clearance within the other vessel so as to allow linear motion within the other vessel, said other separation means also being disposed between said other lower securing means and said other upper securing means, said other separation means also having an underside and a topside;
d. providing a main outlet pipe valve disposed between the main vessel and the flow energy converter;
e. providing a main inlet pipe valve disposed between the main vessel and the flow energy converter;
f. providing an other inlet pipe valve disposed between the other vessel and the flow energy converter;
g. providing an other outlet pipe valve disposed between the other vessel and the flow energy converter;
h. initiating said main descent cycle and an other ascent cycle simultaneously;
i. closing said main inlet pipe valve;
j. opening said main outlet pipe valve;
k. closing said other outlet pipe valve;
l. opening said other inlet pipe valve;
m. injecting said compressed gas with an other compressed gas injection means below said underside of said other separation means being held near bottom of the other vessel by said other lower securing means;
n. releasing said main separation means from said main upper securing means;
o. allowing said main separation means to descend; and simultaneously,
p. releasing said other separation means from said other lower securing means;

q. allowing said other separation means to ascend;
r. forcing said fluid above said other separation means upward through said other inlet pipe valve and through said flow energy converter at an increasing pressure; said fluid,
s. continuing through said main outlet pipe valve and into the main vessel; thereby,
t. refilling the main vessel as said fluid flows from the bottom thereof to the bottom of the other vessel; thereby also,
u. resupplying said fluid within the main vessel which provides the gravitational force which allows the buoyancy force to work within the other vessel;
v. docking said other separation means with said other upper securing means;
w. evacuating said compresses gas pocket from said underside of said other separation means with an other compressed gas evacuation means;
x. docking said main separation means with main lower securing means;
y. opening said main inlet pipe valve;
z. closing said main outlet pipe valve;
aa. opening said other outlet pipe valve;
bb. closing said other inlet pipe valve;
cc. ending said other ascent cycle and said main descent cycle;
wherein while said main separation means is ascending and producing energy said other separation means is descending and while said other separation means is ascending and producing energy said main separation means is descending.

14. A machine that forces a fluid through at least one flow energy converter at a consistent and steady pressure during an ascent cycle within an enclosed fluid loop system, comprising:
a. a fluid;
b. at least one elongated main vessel of a predetermined transverse cross sectional shape;
c. at least one elongated other vessel of a predetermined transverse cross sectional shape, the main vessel and the other vessel to be connected at bottom to each other so as to allow fluid flow to and from each other;
d. the flow energy converter to be located near top of the main vessel and the other vessel, the flow energy converter is connected to the main vessel and the other vessel so as to allow fluid flow to and from the main vessel and the other vessel;
e. a main lower securing means disposed within and near bottom of the main vessel;
f. a main upper securing means disposed within and near top of the main vessel;
g. the main vessel and the other vessel to be filled with said fluid, said fluid being in communication within and between the main vessel and the other vessel at both near top and bottom, thereby creating an internal fluid loop within and between the main vessel and the other vessel;
h. a main hollow piston of predetermined weight, size, and shape disposed with minimal clearance within the main vessel so as to allow linear motion within the main vessel, said main hollow piston also being disposed between said main lower securing means and said main upper securing means, said main hollow piston also having an underside and a topside, said main hollow piston being hollow;
i. a main hollow piston upper fill valve disposed at said topside of said main hollow piston, thereby allowing a weighted matter of solid or fluid composition access into said main hollow piston;
j. a main upper fill valve disposed through top of the main vessel, said main upper fill valve designed to couple with said main hollow piston upper fill valve, thereby allowing a weighted matter of solid or fluid composition fill cycle to begin and end;
k. a main hollow piston lower empty valve disposed at said underside of said main hollow piston, thereby allowing said weighted matter of solid or fluid composition access out of said main hollow piston;
l. a main lower empty valve disposed through bottom of the main vessel, said main lower empty valve designed to couple with said main hollow piston lower empty valve, thereby allowing a weighted matter of solid or fluid composition empty cycle to begin and end;
whereby through the alternate filling and emptying of said main hollow piston with said weighted matter of solid or fluid composition allows for said ascent cycle and a descent cycle using the forces of gravity and buoyancy, whereby also, said internal fluid loop constitutes a gravity source and gravity force from within said machine.

15. The machine of claim 14, further comprising:
a. an undercarriage with wheels disposed at lower side of said main hollow piston;
whereby through the utilization of said undercarriage with wheels, friction will be reduced within the vessels if the vessels are erected in an other than generally vertical position.

16. The machine of claim 14 further comprising:
a. a main outlet pipe valve located near top of the main vessel, disposed between the main vessel and said flow energy converter so as to allow controlled fluid flow between the main vessel and said flow energy converter;
b. a main inlet pipe valve located near top of the main vessel, disposed between the main vessel and said flow energy converter so as to allow controlled fluid flow between the main vessel and said flow energy converter;
c. an other inlet pipe valve located near top of the other vessel, disposed between the other vessel and said flow energy converter so as to allow controlled fluid flow between the other vessel and said flow energy converter;
d. an other outlet pipe valve located near top of the other vessel, disposed between the other vessel and said flow energy converter so as to allow controlled fluid flow between the other vessel and said flow energy converter;
whereby through the use of the inlet and the outlet valves, fluid flow is guided so as to allow said fluid to act forcibly through said flow energy converter during said descent cycle as well as said ascent cycle.

17. The machine of claim 14 further comprising:
a. a main outlet pipe valve located near top of the main vessel, disposed between the main vessel and said flow energy converter so as to allow controlled fluid flow between the main vessel and said flow energy converter;
b. a main inlet pipe valve located near top of the main vessel, disposed between the main vessel and said flow energy converter so as to allow controlled fluid flow between the main vessel and said flow energy converter;

c. an other inlet pipe valve located near top of the other vessel, disposed between the other vessel and said flow energy converter so as to allow controlled fluid flow between the other vessel and said flow energy converter;
d. an other outlet pipe valve located near top of the other vessel, disposed between the other vessel and said flow energy converter so as to allow controlled fluid flow between the other vessel and said flow energy converter;
e. an other lower securing means disposed within and near bottom of the other vessel;
f. an other upper securing means disposed within and near top of the other vessel;
g. an other hollow piston of predetermined weight, size, and shape disposed with minimal clearance within the other vessel so as to allow linear motion within the other vessel, said other piston also being disposed between said other lower securing means and said other upper securing means, said other piston also having an underside and a topside, said other hollow piston being hollow;
h. an other hollow piston upper fill valve disposed at said topside of said other hollow piston, thereby allowing said weighted matter of solid or fluid composition access into said other hollow piston;
i. an other upper fill valve disposed through top of the other vessel, said other upper fill valve designed to couple with said other hollow piston upper fill valve, thereby allowing said weighted matter of solid or fluid composition fill cycle to begin and end;
j. an other hollow piston lower empty valve disposed at said underside of said other hollow piston, thereby allowing said weighted matter of solid or fluid composition access out of said other hollow piston;
k. an other lower empty valve disposed through bottom of the other vessel, said other lower empty valve designed to couple with said other hollow piston lower empty valve, thereby allowing said weighted matter of solid or fluid composition empty cycle to begin and end;
whereby through the alternate filling and emptying of said main hollow piston and said other hollow piston with said weighted matter of solid or fluid composition allows for an opposing ascent and an opposing descent cycle using the force of gravity, while said main hollow piston is in said ascent cycle, said other hollow piston is in said descent cycle and vice versa, whereby also, said internal fluid loop constitutes a gravity source and gravity force from within said machine.

\* \* \* \* \*